US010413835B2

(12) United States Patent
Hidaka et al.

(10) Patent No.: US 10,413,835 B2
(45) Date of Patent: Sep. 17, 2019

(54) GAME SYSTEM AND GAME DEVICE

(71) Applicant: KONAMI DIGITAL ENTERTAINMENT CO., LTD., Tokyo (JP)

(72) Inventors: Shota Hidaka, Minato-ku (JP); Masakazu Shibamiya, Minato-ku (JP); Kenichi Yamamoto, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 1139 days.

(21) Appl. No.: 14/378,916

(22) PCT Filed: Feb. 15, 2013

(86) PCT No.: PCT/JP2013/005692
§ 371 (c)(1),
(2) Date: Aug. 14, 2014

(87) PCT Pub. No.: WO2013/122203
PCT Pub. Date: Aug. 22, 2013

(65) Prior Publication Data
US 2015/0087368 A1  Mar. 26, 2015

(30) Foreign Application Priority Data
Feb. 16, 2012  (JP) ................. 2012-032218

(51) Int. Cl.
*A63F 13/00* (2014.01)
*A63F 13/87* (2014.01)
*A63F 13/79* (2014.01)

(52) U.S. Cl.
CPC ............. *A63F 13/87* (2014.09); *A63F 13/79* (2014.09); *A63F 2300/5593* (2013.01); *A63F 2300/572* (2013.01)

(58) Field of Classification Search
CPC ........... A63F 13/87; A63F 13/79; G06Q 50/01
See application file for complete search history.

(56) References Cited

U.S. PATENT DOCUMENTS

| 6,699,125 B2 * | 3/2004 | Kirmse | .................. A63F 13/12 463/42 |
|---|---|---|---|
| 6,755,743 B1 | 6/2004 | Yamashita et al. | |

(Continued)

FOREIGN PATENT DOCUMENTS

| JP | 2000254345 A | * | 9/2000 |
|---|---|---|---|
| JP | 2002-259313 A | | 9/2002 |

(Continued)

OTHER PUBLICATIONS

International Search Report—dated May 14, 2013.
(Continued)

*Primary Examiner* — David L Lewis
*Assistant Examiner* — Eric M Thomas
(74) *Attorney, Agent, or Firm* — Howard & Howard Attorneys PLLC

(57) ABSTRACT

The present invention provides a game system having a communication function that takes into account player operability. A game device on which a mah-jongg game is executed holds registered comment information in which a plurality of registered comments are associated with a predetermined particular state in the mah-jongg game, and when a current game state transitions to the particular state, displays the plurality of registered comments associated with the particular state on a game screen. Delivery information that includes a registered comment selected by a player as a transmission comment is then sent to a server. The server holds a plurality of delivery destination addresses to which the delivery information of the player is to be sent via an open network, and when the delivery information is received from the game device, delivers the delivery infor- (Continued)

mation to each delivery destination address pertaining to the player corresponding to the delivery information.

10 Claims, 15 Drawing Sheets

(56) References Cited

U.S. PATENT DOCUMENTS

| | | |
|---|---|---|
| 2002/0129112 A1 | 9/2002 | Maehiro |
| 2004/0198497 A1 | 10/2004 | Yamashita et al. |
| 2004/0198498 A1 | 10/2004 | Yamashita et al. |
| 2005/0209008 A1 | 9/2005 | Shimizu et al. |
| 2006/0003838 A1 | 1/2006 | Kobayashi et al. |
| 2008/0139227 A1* | 6/2008 | Wong .............. G06F 3/0237 455/466 |
| 2008/0217075 A1* | 9/2008 | Gordner ............ G06F 3/0234 178/18.01 |
| 2013/0130794 A1 | 5/2013 | Oshima et al. |

FOREIGN PATENT DOCUMENTS

| | | |
|---|---|---|
| JP | 2004-229846 A | 8/2004 |
| JP | 3934649 B2 | 6/2007 |
| JP | 2011-005306 A | 1/2011 |
| JP | 2011-115472 A | 6/2011 |
| WO | 2012/017995 A1 | 2/2012 |

OTHER PUBLICATIONS

Japanese Office Action with English Translation (JP 2012-032218)—Dispatch dated May 7, 2013.
Japanese Office Action with English Translation (JP 2012-032219)—Dispatch dated May 7, 2013.
Notice of Allowance (U.S. Appl. No. 14/378,923); dated Aug. 25, 2017; 9 pages.
Non-Final Office Action (U.S. Appl. No. 14/378,923); Notification dated Mar. 24, 2017.

* cited by examiner

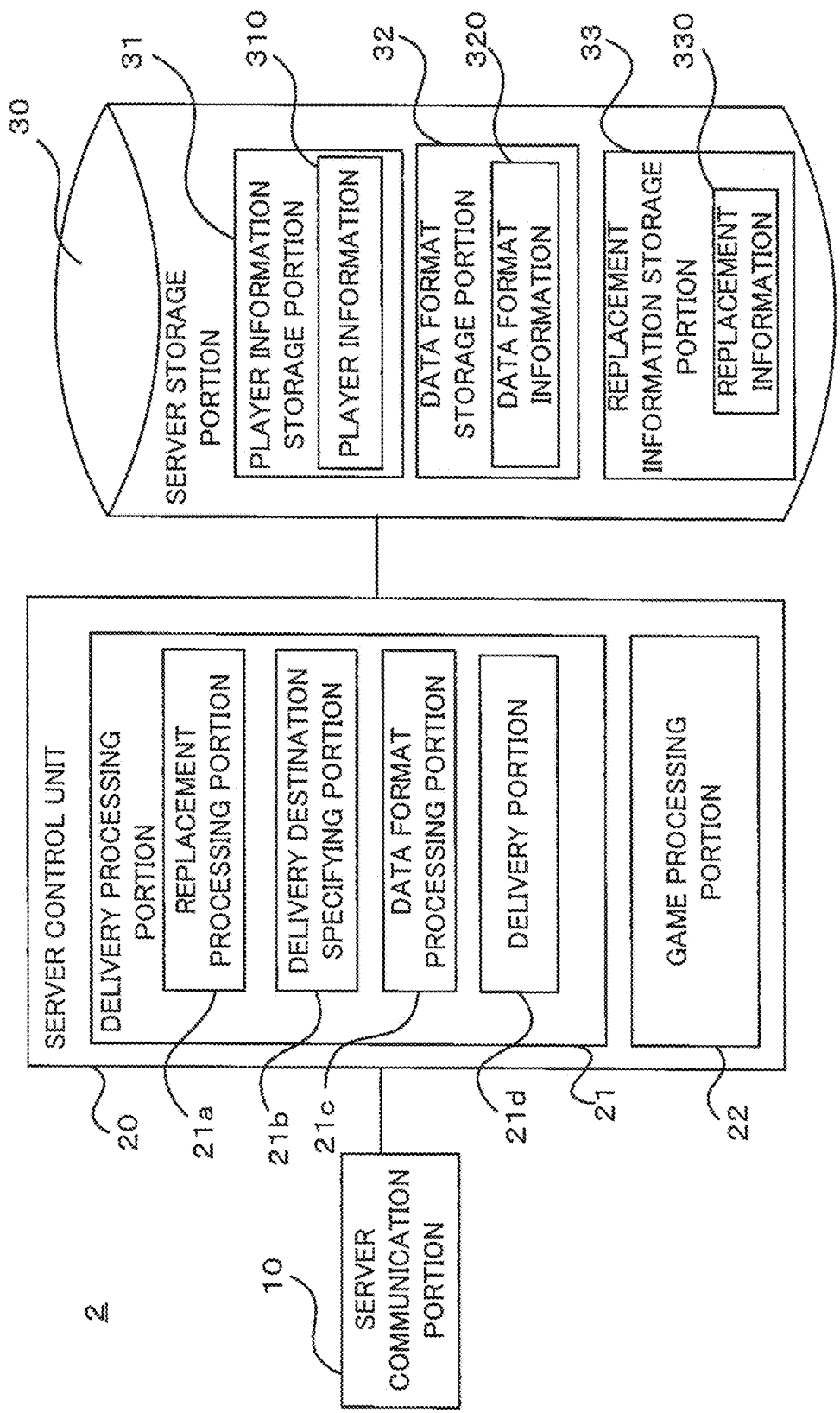

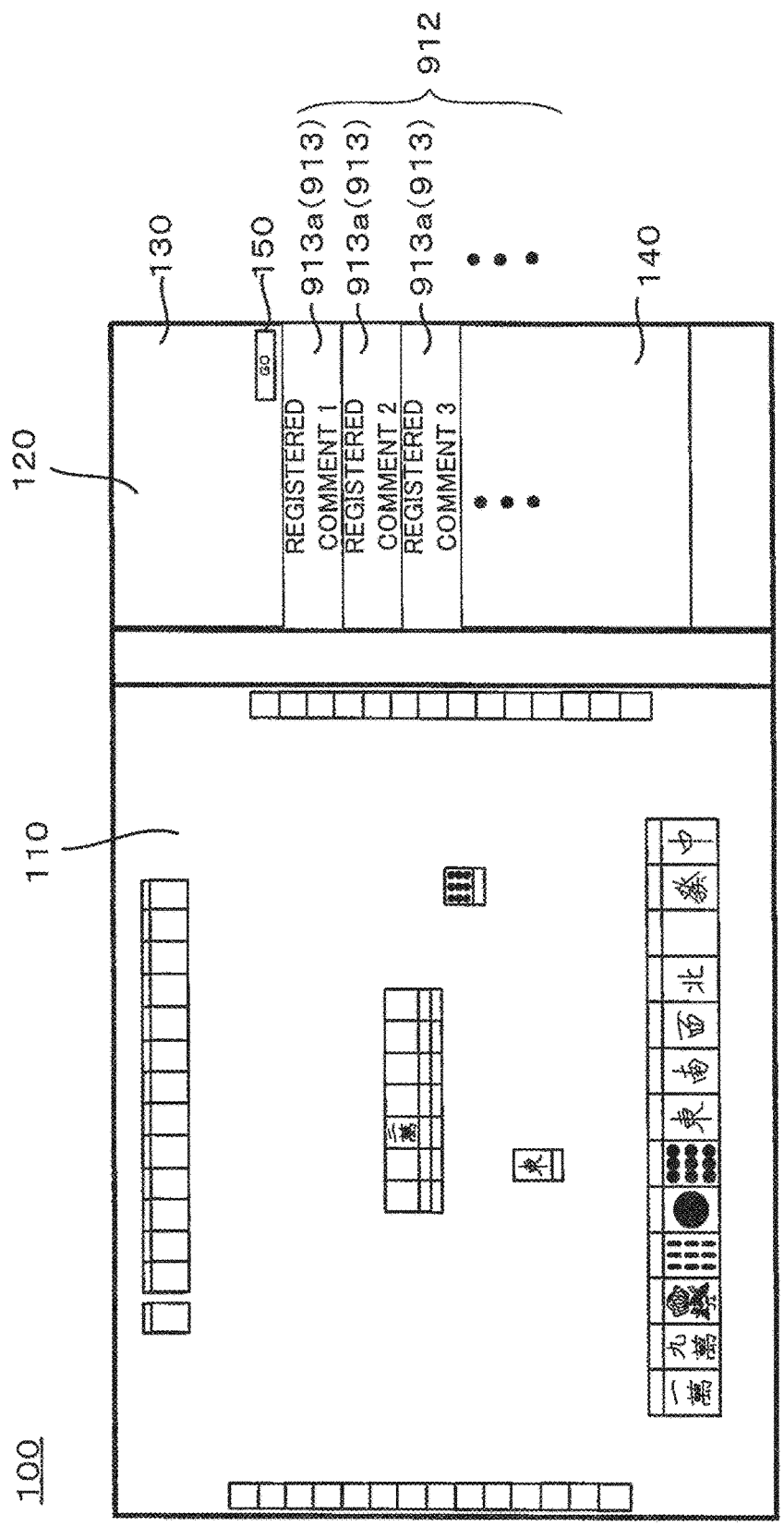

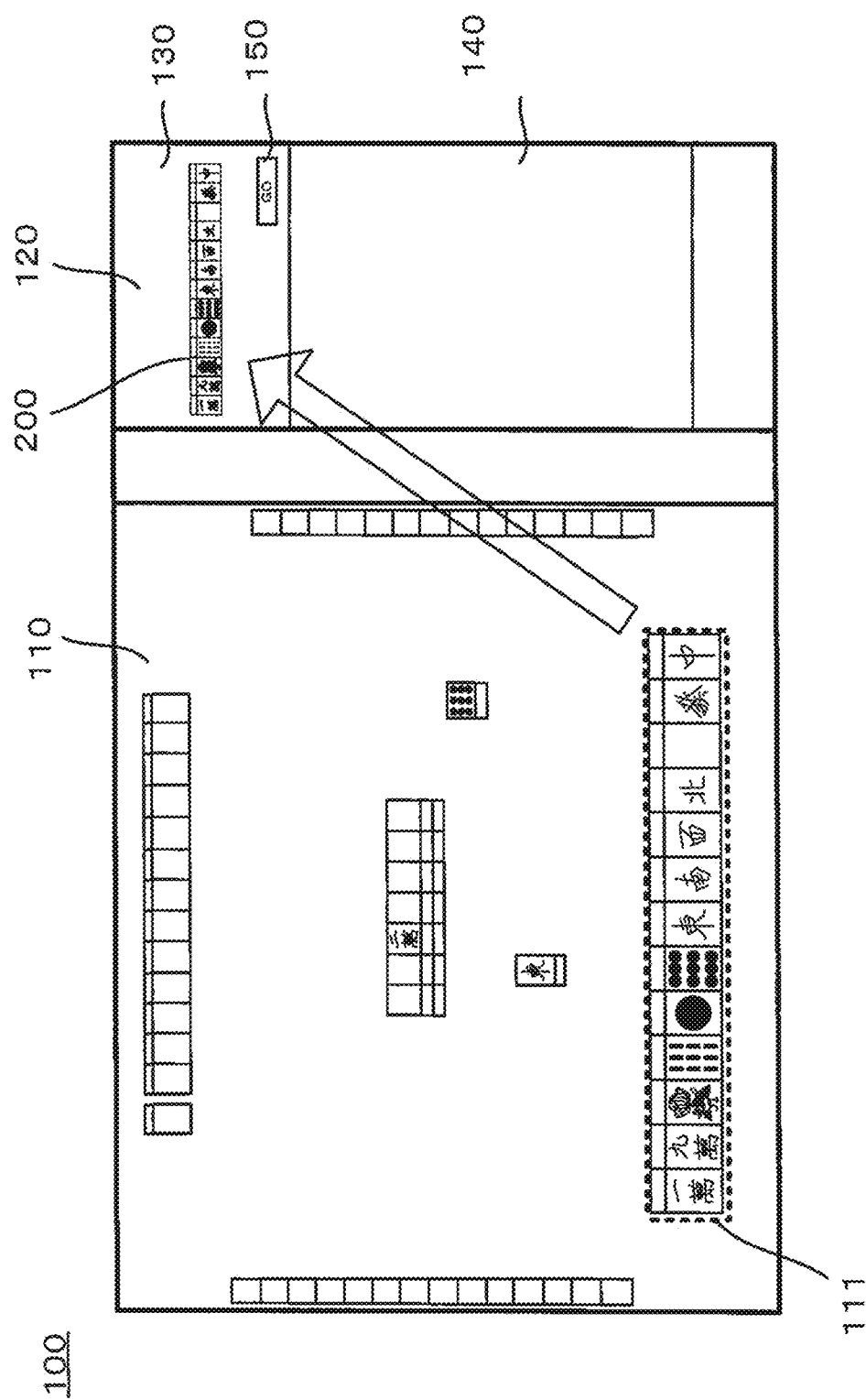

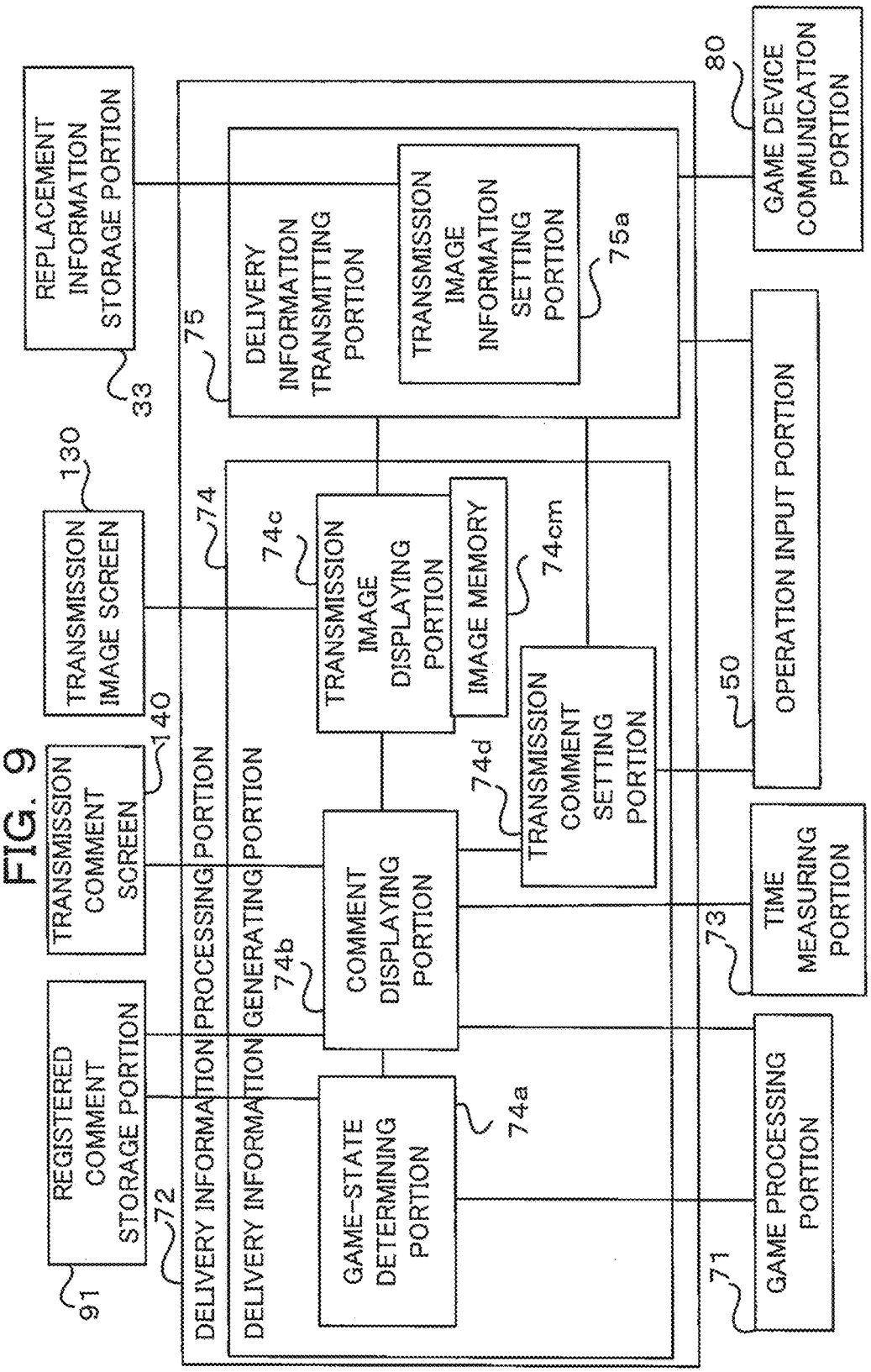

GAME SYSTEM AND GAME DEVICE

CROSS REFERENCE TO RELATED APPLICAION

This application is a national stage of PC/JP2013/053692, filed Feb. 15, 2013, which claims priority to Japanese Patent Application No. 2012-032218, Feb. 16, 2012, the disclosure of which are hereby incorporated by reference in their entirety.

TECHNICAL FIELD

The present invention relates to a game system including a game device having a communication function, and the game device.

With respect to game systems where a game is executed among plural game devices, a game system having a so-called communication function such that message exchange is allowed between players during the game has been already well known (for example, see Patent literature 1 and Patent literature 2).

CITATION LIST

Patent Literature

PTL1: JP-A-2011-005306 and PTL2: JP-A-2011-115472.

SUMMARY OF INVENTION

Technical Problem

However, when a message is transmitted during execution of a game, a player executing the game has to input the message while performing operations for the game. For example, in a case that the text of the message is input from a keyboard, there is a problem that the player cannot concentrate on game operations and game states while inputting the text. In particular, such a situation would be a big load on a player who is not used to inputting operations with a keyboard. Furthermore, with respect to a game device for commercial use, in a case that a charge is required for the number of uses of a game, it is necessary to increase the frequency the game is played. Accordingly, it is not preferable that the frequency the game is played decreases because time is spent in operations other than game operations.

Then, the present invention aims to provide a game system having a communication function which takes into account the operability for a player, and a game device for the game system.

Solution to Problem

The above problems are solved by a game system according to one aspect of the present invention. The game system includes a server and at least one game device which are communicable with each other, the game device having: an operation input portion for accepting operations by a player; and a display portion where a game screen is displayed, wherein the game device comprises: a registered comment storage portion which stores registered comment information where each of a plurality of particular states in a game and at least one comment are correlated to each other; and a computer functioning as: a game processing portion which is configured to display a current game state in a game-state displaying area on the game screen, while controlling to progress the game; and a delivery information processing portion which is configured to generate delivery information to be delivered via the server, the delivery information processing portion including: a game-state determining portion which is configured to determine whether or not the current game state managed by the game processing portion is any one of the plurality of particular states; a comment displaying portion which is configured to display, in a case that the current game state is the particular state, the at least one registered comment correlated to the particular state in a transmission comment displaying area on the game screen; a transmission comment setting portion which is configured to, in response to an selection operation by the player for selecting a registered comment from the at least one registered comment displayed, set the registered comment selected as a transmission comment; and a delivery information transmitting portion which is configured to, in response to a predetermined transmission operation by the player, transmit the delivery information including the transmission comment to the server, together with player identification information of the player, and the server comprises: a player information storage portion which stores player information including delivery destination specifying information for specifying at least one delivery destination to which the delivery information of the player is delivered via a predetermined network; and a computer functioning as: a delivery destination specifying portion which is configured to refer to the player information, when receiving the delivery information, to specify the delivery destination corresponding to the player identification information indicated by the delivery information; and a delivery portion which is configured to deliver the delivery information to each delivery destination specified via the network.

In the game system of the present invention, in the registered comment storage portion of the game device, at least one registered comment for each of the plurality of particular states in the game is stored in association with the particular state. When the ongoing game has become any one of the particular states, a list of the registered comments correlated to the particular state is displayed by the comment displaying portion. By the transmission comment setting portion, a player is allowed to set his/her own comment, if he/she just selects his/her desired registered comment from the list of registered comments displayed. Since the list of registered comments is displayed in the transmission comment displaying area which is a part of the game screen in a state that the game state is displayed in the game-state displaying area, it is possible for the player to generate his/her own comment only with a simple selection operation. That is, the player can generate his/her comment, without being bothered by a character input operation for generating the comment in the game. Further, when the delivery information is transmitted to the server by the transmission operation, the server delivers the delivery information to each of the delivery destinations correlated with the player who has transmitted the delivery information. Since the delivery information is transmitted to each delivery destination via the predetermined network, it is possible to set the delivery destinations in a broad range. In this way, according to the game system of the present invention, it is possible to deliver player's comment broadly in the middle of ongoing game only with a simple operation. Accordingly, the present invention provides a game system having a communication function taking into account the operability for a player.

The game executed by the game device of the present invention may be a game which is executed among a plurality of game devices, or may be a game which is progressed based on operations by only one player of one game device. To the registered comment of the present invention, not only textual information, but also information recognized visually or aurally, such as sound information, an illustration, a moving image, a photograph, and a pictorial symbol, can be applied. Any transmission comment displaying area is acceptable, as long as the position and size of the transmission comment displaying area on the game screen are set so as not to impede game operations by the player. Accordingly, on the game screen, the transmission comment displaying area may be adjacent to the game-state displaying portion, or may overlap with the game-state displaying area partially.

The network of the present invention can be an open network like the internet, or can be a local network. It does not matter which type of data communication system is applied between the server and the game device, a type of data communication via the open network, a type of data communication via the local network, or a type of so-called peer-to-peer data communication. The player identification information to be correlated with the delivery information may be obtained at the game device by a conventional method. For example, there are a case that it is required to input the player identification information by the game device when a player starts to use the game device or to play a game, a case that it is required to input the player identification information by the game device when the delivery information is transmitted, and the like.

The registered comment may be a state incomplete comment including a state insertion portion where information based on a predetermined state which is managed by the game processing portion is to be inserted, and the comment displaying portion may be configured to, when displaying the state incomplete comment, obtain information indicating the predetermined state from the game processing portion, and the insert information based on the predetermined state into the state insertion portion to complete and display the state incomplete comment completed.

According to this invention, a registered comment is generated in a complete state by inserting the information indicating the predetermined state of the game into the state insertion portion set in the state incomplete comment, and thereby, it is possible to present the registered comment generated to the player. Accordingly, even if the registered comments are not prepared for all game states, it is possible to generate automatically a comment on which the current game state reflects appropriately. The player can set this comment as his/her comment.

The game processing portion may be configured to display in the game displaying area, a set of combination of plural kinds of items which is held by the player, and control to progress the game while changing the combination by following the operations by the player, the state insertion portion of the state incomplete comment may be set so that information indicating a state of the plural kinds of items held by the player as the information based on the predetermined state is inserted into the state insertion portion, and the comment displaying portion may be configured to obtain from the game processing portion and insert into the state insertion portion, the information indicating the state of plural kinds of items held by the player to complete the state incomplete comment.

With respect to a game which progresses as changing by operations by the player the combination of plurality kinds of items held by the player, especially when the game has a high number of kinds of items or a high number of items to be held by the player, it is very cumbersome to describe the state of player's items by a key input or the like. According to the present invention, the information indicating the state of items is obtained from the game processing portion, and the comment including the state is generated automatically. Thereby, it is possible to avoid the cumbersome operation for generating the comment. As the items to be used in the game, there are trading cards, playing cards, mah-jongg tiles, and the like. For example, in a case that the game is a mah-jongg game, the plural kinds of items held by the player may be hand tiles of the player.

Further, the game device may comprise the computer further functioning as a time measuring portion which is configured to manage time information, the registered comment may be a time incomplete comment including a time insertion portion where the time information managed by the time measuring portion is to be inserted, and the comment displaying portion may be configured to obtain, when displaying the time incomplete comment, the time information from the game processing portion, and insert the time information obtained into the time insertion portion to complete and display the time incomplete comment completed.

According to this invention, the registered comment is generated in a complete state by inserting current time information into the time insertion portion set in the incomplete comment, and thereby, it is possible to present the registered comment generated to the player. Thereby, even if the registered comments are not be prepared for all cases of time information, it is possible to generate automatically a comment on which the current time information reflects, and the player can set this comment as his/her own comment. The time information includes the date, the elapsed time since a predetermined time, such as the moment of game start and the current time.

Each delivery destination specifying information included in the player information may be stored in association with a data format which the delivery destination requires to receive the delivery information, the server may comprise the computer further functioning as a data format processing portion which is configured to, when the delivery destination is specified, convert a data format of the delivery information to the data format the delivery destination specified requires, and the delivery portion may be configured to deliver to the delivery destination specified, the delivery information in the data format converted. According to this invention, even if the data format of the delivery information which is treated by the delivery destination is different from the data format which is treated in the game system of the present invention, the data format of the delivery information is converted to the data format appropriate for each delivery destination by the data format processing portion. Accordingly, it is possible to prevent limitations caused by a difference in the data format.

On the game screen, a transmission instruction area where to instruct transmission may be further provided, the operation input portion may include a touch panel provided at least on the transmission comment displaying area and the transmission instruction area on the game screen, the transmission comment setting portion may be configured to, when, as the selection operation, an operation for specifying a position corresponding to any one of the registered comments displayed in the transmission comment displaying area is performed to the touch panel, set the registered comment corresponding to the position specified as the registered comment selected, and the delivery information transmitting portion may be configured to transmit the delivery information when an operation for specifying a position corresponding to the transmission instruction area, as the transmission operation, is performed to the touch panel.

According to this invention, the player can continue to play the game without removing his/her eyes from the game screen, from the moment of selection of the registered comment until the moment of transmission of the registered comment. The transmission instruction area may be an area different from the transmission comment displaying area and also from the game-state displaying area, or may be a part of any one of those areas.

In the registered comment information, to each of the particular states, image information of a state image showing the particular state may be further correlated, the game device may have the computer further functioning as a transmission image displaying portion which is configured to display, in a case that the current game state is the particular state, the state image correlated to the particular state in a transmission image displaying area on the game screen, and the delivery information transmitting portion may be configured to transmit to the server, the delivery information including the image information of the state image displayed in the transmission image displaying area, as transmission image information, in addition to the transmission comment. According to this invention, it is possible to include, in addition to the transmission comment, the state image showing the particular state in the delivery information. It is possible to set an image as the registered comment. The image set as the registered comment may be the same as the state image displayed in the transmission image displaying area. Or, it is possible to set each of the images, so that a predetermined state is represented by a combination of the images. Any transmission image displaying area is acceptable, as long as the size and position of the transmission image displaying area in the game screen are set so as not to impede game operations by the player.

Each of the game device and the server may comprise a replacement information storage portion that stores replacement information where image information of a part of the state image and image identification information for identifying the image information are correlated to each other, the delivery information transmitting portion of the game device may be configured to further have a transmission image information setting portion which is configured to refer to the replacement information, and in a case that the image information of the part of the state image to be included in the delivery information is set in the replacement information, replace the image information of the part with the corresponding image identification information to set the transmission image information, and the server may have the computer further functioning as a replacement processing portion which is configured to refer to, when the delivery information is received, the replacement information storage portion and to replace the image identification information in the transmission image information included in the delivery information with the corresponding image information. According to this invention, it is possible to reduce the data amount of the delivery information, when the delivery information to be transmitted to the server includes the image information of the state image.

The above problems are solved by a game device according to one aspect of the present invention. The game device is communicable with a server which delivers deliver information to predetermined delivery destinations, and has: an operation input portion for accepting operations by a player; and a display portion where a game screen is displayed, and the game device comprises: a registered comment storage portion which stores registered comment information where each of a plurality of particular states in a game and at least one comment are correlated to each other; and a computer functioning as: a game processing portion which is configured to display a current game state in a game-state displaying area on the game screen, while controlling to progress the game; and a delivery information processing portion which is configured to generate the delivery information to be delivered from the server, the delivery information processing portion including: a game-state determining portion which is configured to determine whether or not the current game state managed by the game processing portion is any one of the plurality of particular states; a comment displaying portion which is configured to display, in a case that the current game state is the particular state, the at least one registered comment correlated to the particular state in a transmission comment displaying area on the game screen; a transmission comment setting portion which is configured to, in response to an selection operation by the player for selecting a registered comment from the at least one registered comment displayed, set the registered comment selected as a transmission comment; and a delivery information transmitting portion which is configured to, in response to a predetermined transmission operation by the player, transmit the delivery information including the transmission comment to the server, together with player identification information of the player. The game device of the present invention functions as the game device in the game system as one aspect of the present invention.

Effects of Invention

As mentioned above, according to the present invention, the game device is made to: store the registered comment information where plural registered comments are correlated with each particular state in the game; when the game state has become the particular state, display the plural registered comments correlated with the particular state in a predetermined area on the game screen; and send the registered comment selected by a player to the server. The server is made to: store in association with the player, plural delivery destinations to which the delivery information from the player should be delivered via the open network; and, when receiving the delivery information from the game device, deliver the delivery information to the delivery destinations correlated with the corresponding player. Thereby, it is possible to provide a game system and a game device, each having a communicable function which takes into account the operability for a player.

BRIEF DESCRIPTION OF DRAWINGS

FIG. 2 is a schematic configuration diagram of hardware of the center server in the game system shown in FIG. 1;

FIG. 7 is a diagram showing a state that the registered comment group is displayed on the transmission comment screen;

FIG. 8 is a diagram showing a state that the capture image is displayed on the transmission image screen;

FIG. 9 is a functional block diagram showing operations of the game device control unit in the first embodiment;

DESCRIPTION OF EMBODIMENTS

Figure 1:
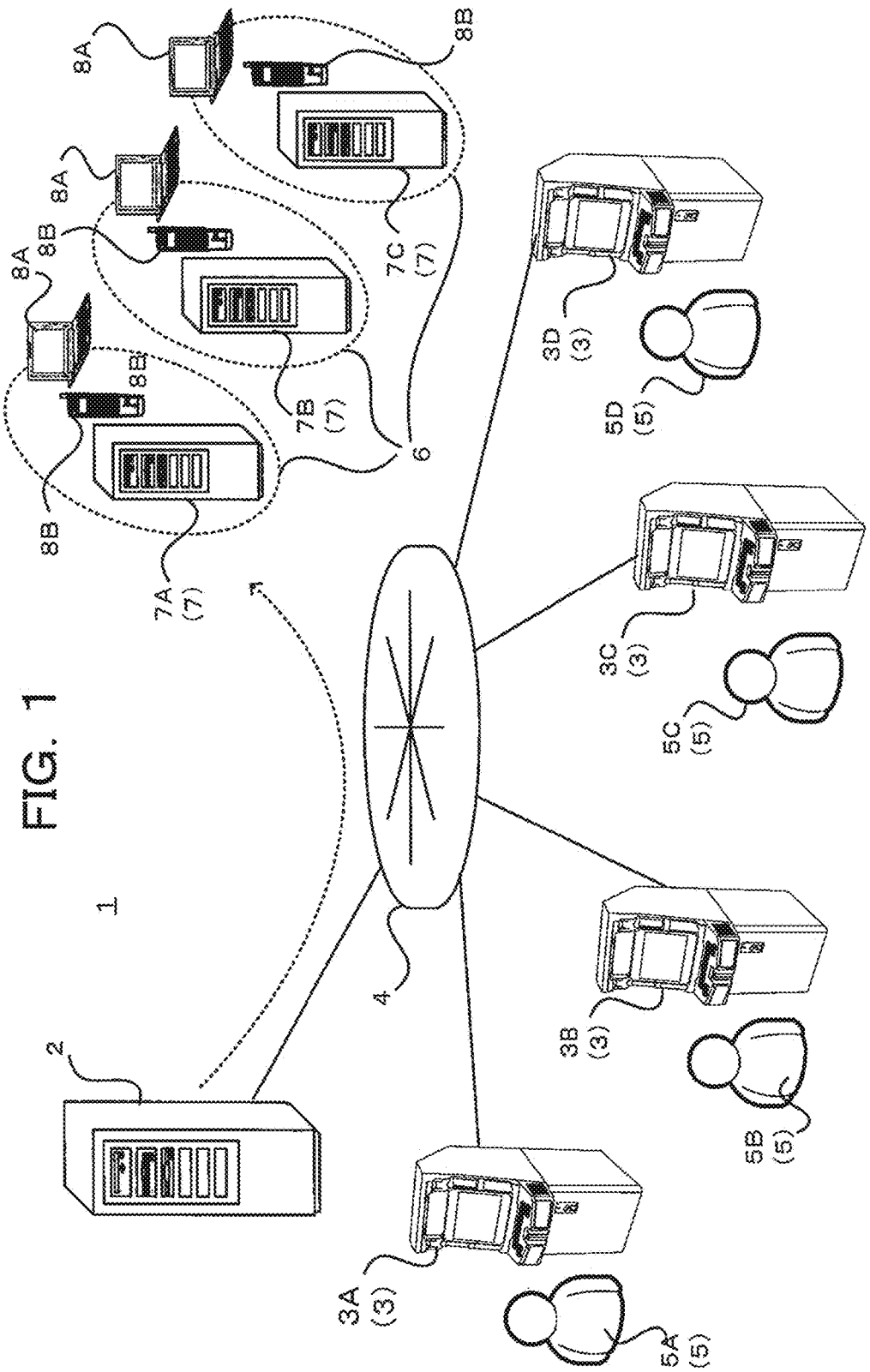
FIG. 1 is a diagram showing one example of the game system of the present invention.

FIG. 1 shows a game system 1 of one aspect of the present invention. In the game system 1, a center server 2 and each of a plurality of game devices 3A, 3B, 3C and 3D are data-communicably connected with each other via a network 4 (in this embodiment, the internet as an open network). The game devices 3A, 3B, 3C and 3D are operated by players 5A, 5B, 5C and 5D respectively. In the game system 1, a battle game (in this embodiment, a mah-jongg game) is executed among the game devices 3A to 3D. Hereinafter, in a case that each of the game devices 3A to 3D is not distinguished from each other, each of them will be referred to as "the game device 3". In a case that each of the players 5A to 5D is not distinguished from each other, each of them will be referred to as "the player 5". Further, the network 4 will be sometimes referred to as "the internet 4". It does not matter which connection style is employed between the nodes 3 and 4, wired or wireless.

The center server 2 is also capable of accessing, using the internet 4, a group of service providing severs 7A, 7B and 7C included in an internet service providing system 6 (hereinafter, will be referred to as "the exterior system 6"). The group of service providing servers 7A, 7B and 7C includes, for example, a service providing server 7A as an internet service provider, a service providing server 7B for a social networking service (hereinafter, will be referred to as "the SNS") and a service providing server 7C for a portable phone system. Thereby, the center server 2 is allowed to transmit data to a portable phone 8B and a personal computer 8A in the exterior system 6 via the service providing servers 7A to 7C. Hereinafter, in a case that each of the service providing servers 7A to 7B is not distinguished from each other, each of them will be referred to as "the service providing server 7".

The game device 3 is a game device for commercial use installed in an amusement facility (an amusement store). The game device 3 is connected with the network 4 via a store server (not illustrated). Each of the game devices 3A to 3C may be installed in a different store, or a part of them may be installed in the same store. In the game device 3, the mah-jongg game is executed as mentioned above. In addition, in the game device 3, delivery information is generated during the mah-jongg game, and delivered to the exterior system 6 via the center server 2.

A hardware configuration will be explained with respect to each of the center server 2 and the game device 3 in the game system 1. First, the hardware configuration of the center server 2 will be explained in reference to FIG. 2. The center server 2 comprises a server communication portion 10, a server control unit 20 and a server storage portion 30. The server communication portion 10 executes data communication with each node 3, 7 via the internet 4. The server control unit 20 controls operations of the center server 2. The server storage portion 30 stores various kinds of data in addition to a server program necessary for processing in the center server 2.

The server control unit 20 is established as a computer configured by a CPU and an internal memory area necessary for operations of the CPU. The server control unit 20 functions, by executing the server program, as a delivery processing portion 21 which handles delivery information obtained from the game device 3 and a game processing portion 22 which manages the progress of the mah-jongg game executed in the game devices 3A to 3D. To the operations of the server control unit 20 as the game processing portion 22, the operations of a game server for a well-known network battle game can be applied. When the server program is executed, thereby, in the delivery portion 21, a replacement processing portion 21a, a delivery destination specifying portion 21b, a data format processing portion 21c and a delivery portion 21d are established logically. The function of each of the portions 21a to 21d will be described later.

Figure 3A:
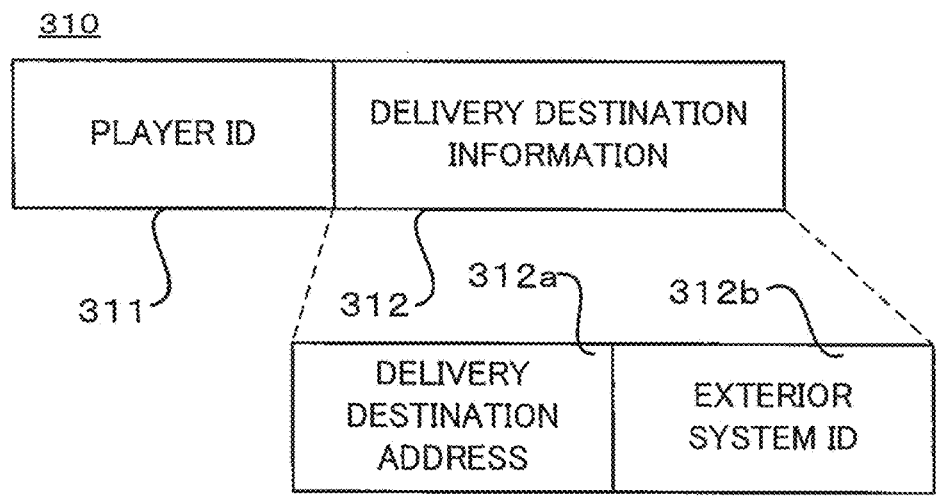
FIG. 3A is a diagram showing one example of data structure of the player information.

The server storage portion 30 includes a player information storage portion 31, a data format storage portion 32 and a replacement information storage portion 33. In the player information storage portion 31, stored is player information 310 which is information relating to each player 5. As shown in FIG. 3A, the player information 310 includes a player ID 311 for identifying the player 5 in the game system 1 and delivery destination information 312 for specifying a delivery destination of delivery information. "The delivery destination" corresponds to a user of the exterior system 6 who finally receives the delivery information (hereinafter, the user will be sometimes referred to as "the exterior user").

The delivery destination information 312 of the present embodiment includes a delivery destination address 312a and an exterior system ID 312b. The delivery destination address 312a is a unique address (or a unique domain) for specifying the delivery destination on the internet 4, and thereby, functions as delivery destination specifying information. For example, the delivery destination address 312a is an e-mail address on the internet 4 in a case that the delivery information is delivered as an e-mail, and is a domain for posting comment in a case that the delivery information is posted as a comment in the SNS. The exterior system ID 312b is an ID for identifying the exterior system 6 corresponding to the delivery destination address 312a.

Figure 3B:
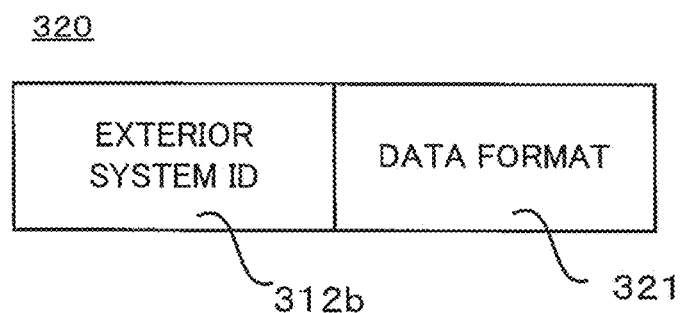
FIG. 3B is a diagram showing one example of the data structure of the format information.

In the data format storage portion 32, stored is data format information 320 where information relating to data format is set for each exterior system 6. As shown in FIG. 3B, the data format information 320 includes the exterior system ID 312b and data format 321. The data format 321 indicates the data format required by the corresponding exterior system 6 and the processing for delivery information which is not handled by the exterior system 6. The data format required by the exterior system 6 is a data format complying with data communication system of the exterior system 6. For example, in a case of the exterior system 6 where communication of particular information (for example, image information) is managed by a particular information management server, the data format 321 is set so that the particular information included in delivery information is transmitted to the particular information management server. Further, with respect to the delivery information which is not handled by the exterior system 6 (for example, sound information), data format to which the delivery information should be converted (for example, illustration information of musical notes or the like) is set in the data format 321.

Figure 3C:
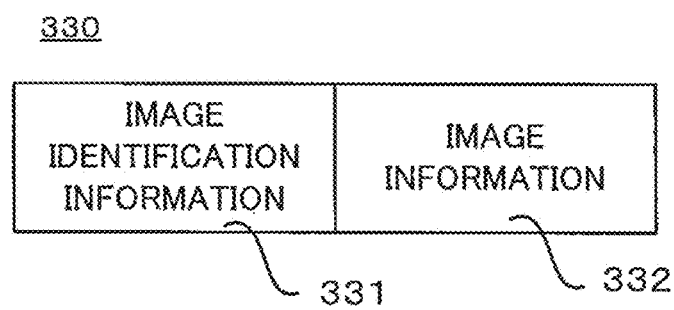
FIG. 3C is a diagram showing one example of the data structure of the replacement information.

In the replacement information storage portion 33, replacement information 330 is stored. As shown in FIG. 3C, in the replacement information 330, image identification information 331 and image information 332 are correlated with each other. The image information 332 is image information for a partial image of a game screen. It is preferable that this partial image is an image which is likely to be delivered as a comment by the player 5. For example, the partial image may be an image where at least one item to be used in a game is displayed in a predetermined state. The image identification information 331 is identification information for identifying the image information 332 in the game system 1. In the present embodiment, the front image of each tile to be used in the mah-jongg is used as the partial image, and the replacement information 330 relating to the front image of each tile is set.

Figure 4:
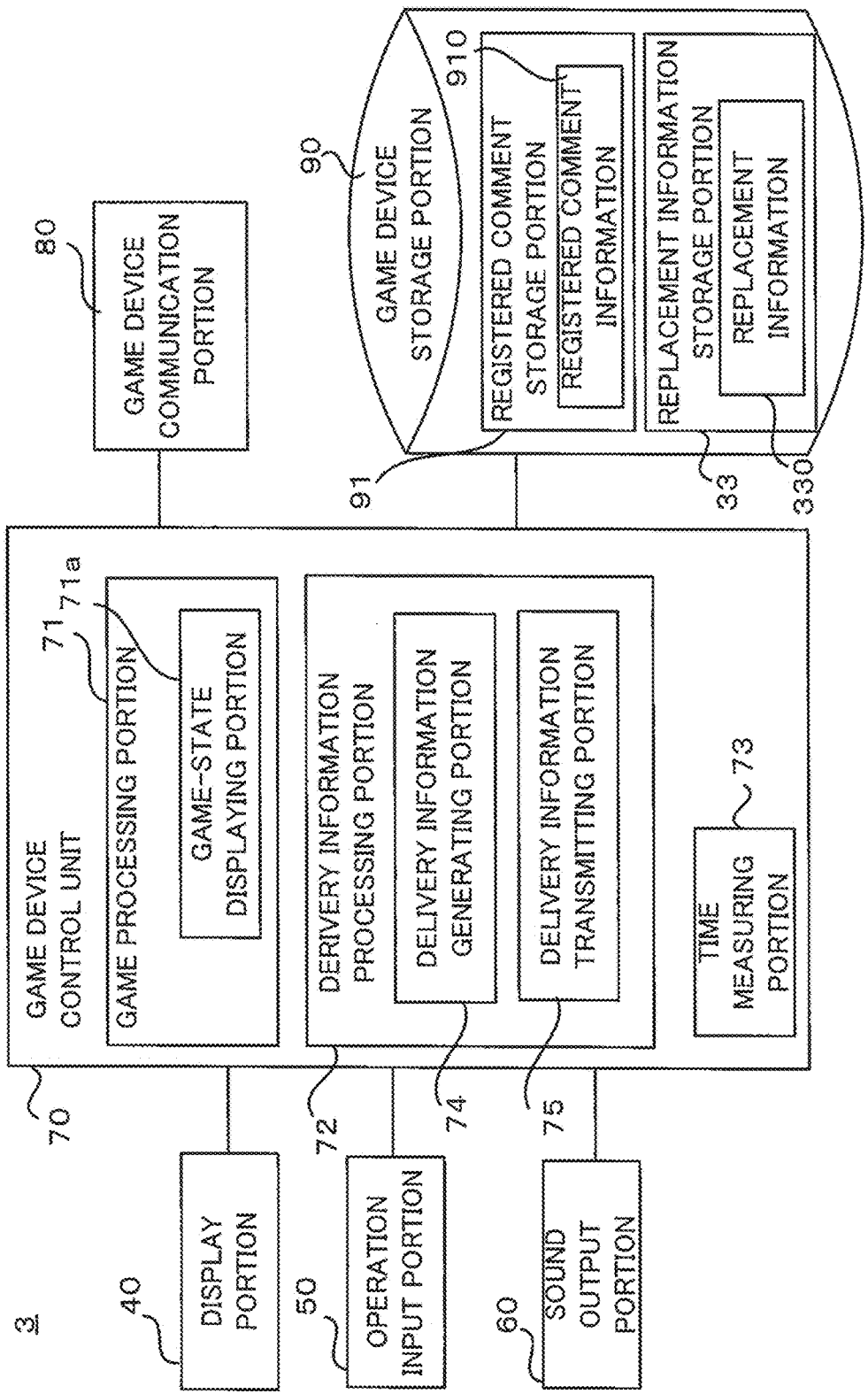
FIG. 4 is a schematic configuration diagram of hardware of the game device in the game system shown in FIG. 1.

A hardware configuration of the game device 3 will be described using FIG. 4. The game device 3 comprises: a display portion 40; an operation input portion 50; a sound output portion 60; a game device control unit 70 for controlling operations of the game device 3; a game device communication portion 80; and a game device storage portion 90. The display portion 40 includes a monitor and displays the game screen on a monitor screen. The operation input portion 50 accepts operations by the player 5. The sound output portion 60 includes a speaker and outputs various sounds from the speaker. The game device communication portion 80 executes data communication with other game devices 3 and the center server 2 via the internet 4. The game device storage portion 90 stores game device programs and various kinds of data.

The operation input portion 50 includes a touch panel provided on the monitor screen of the display portion 40, in addition to various kinds of operation buttons and operation keys. It does not matter which type the touch panel is. Any type of touch panel can be employed as long as the touch panel can detect a position of a finger on the monitor screen. In the present embodiment, a case that a contact touch panel which detects the positions of a finger by contact operations by the finger is employed as the touch panel will be described. Hereinafter, the operation that a position is indicated by a finger on the touch panel is called the touch operation.

Figure 5:
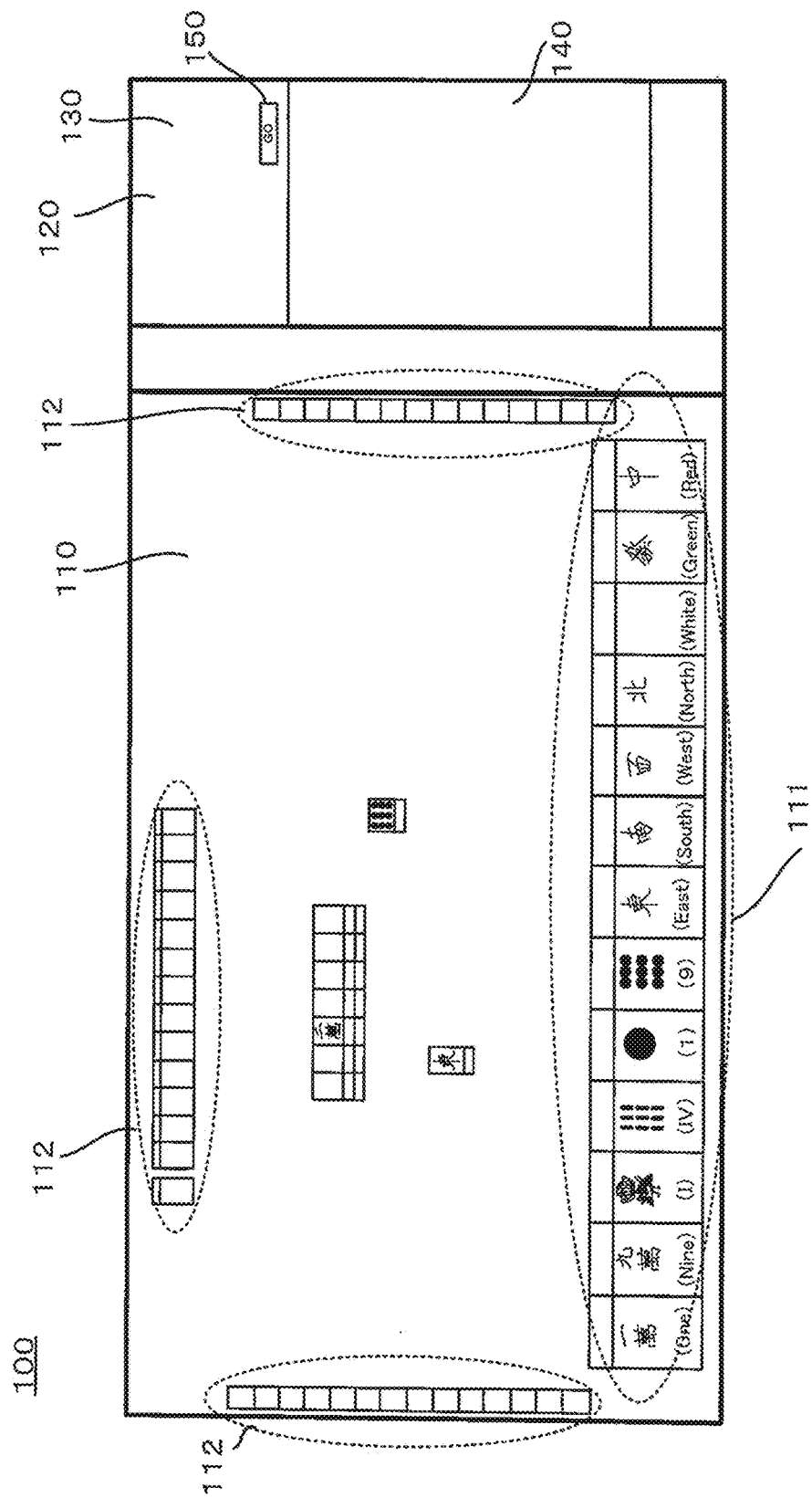
FIG. 5 is a diagram showing one example of the game screen.

FIG. 5 shows one example of the game screen 100 which is displayed on the monitor screen of the game device 3. The game screen 100 has a game-state screen 110 as a game-state displaying area and a delivery information screen 120 adjacent to the game-state screen 110. In the present embodiment, the aspect ratio of the game screen 100 is approximately 16:9, and the ratio of the wide of the game-state screen 110 to the wide of the delivery information screen 120 is 12:4. On the game-state screen 110 of the present embodiment, the current state of the table in the mah-jongg game is displayed, as with a game screen of a conventional mah-jongg game. For example, in the game device 3A, the hand tiles 111 of the player 5A are displayed on the near side of the player. The hand tiles 112 of the other players 5B, 5C and 5D are displayed so as not to be recognized by the player 5A.

The delivery information screen 120 is a screen for generating delivery information, and includes a transmission image screen 130 as a transmission image displaying area, a transmission comment screen 140 as a transmission comment displaying area, and a transmission instruction portion 150. On the transmission image screen 130, an image to be included in the delivery information (hereinafter, referred to as "the transmission image") is displayed. On the other hand, on the transmission comment screen 140, a comment to be included in the delivery information (hereinafter, referred to as "the transmission comment") is displayed. The transmission comment is sometimes a registered comment registered in advance, and sometimes an inputted comment inputted by an input operation of the player 5. When the touch operation is performed to the transmission instruction portion 150 as the transmission instruction operation, either the transmission comment or the transmission image, or both are transmitted to the center server 2 as the delivery information.

Figure 6A:
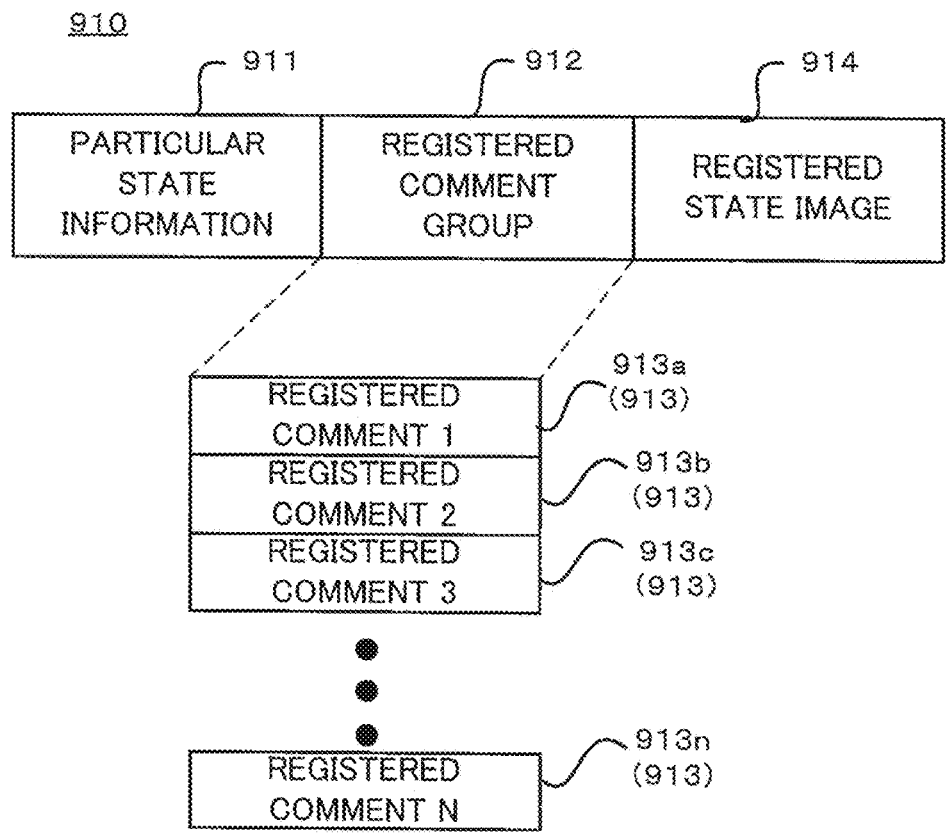
FIG. 6A is a diagram showing one example of the data structure of the registered comment information.

In the game device storage portion 90, registered comment storage portion 91 and replacement information storage portion 33 are included. The replacement information storage portion 33 holds the same replacement information 330 as the replacement information storage portion 33 of the server storage portion 30. In the registered comment storage portion 91, stored is registered comment information 910 where at least one registered comment is set for each particular game state of the mah-jongg game. As shown in FIG. 6A, the registered comment information 910 includes particular state information 911, a registered comment group 912, and registered state image 914. The particular state information 911 is information which indicates a particular game state (hereinafter, referred to as "the particular state") which could happen from start of game-play of the mah-jongg game to end of the game-play.

The particular state is preferably a state that the player 5 is likely to feel some emotion (such as happiness, anger, sadness or suffering). In the present embodiment, as the particular state relating to contents of the game, for example, a moment when any value tiles have been collected, a moment of finishing, a moment of winning, a moment when the game has been drawn, and the like are included. As the particular state relating to environments of the game, for example, a moment when the game-play starts, a moment when the game-play ends, and the like are included.

In the registered comment group 912, a plurality of registered comments 913a, 913b, 913c . . . 913n are correlated to one particular state. Each of the registered comments 913a to 913n is a comment registered as a candidate for the player 5's comment on the corresponding particular state. In the example of FIG. 6A, the plurality of registered comments 913a to 913n are set in the registered comment group 912. However, only one registered comment 913a may be set in the registered comment group 912. Hereinafter, when it is not necessary to distinguish each of the registered comments 913a to 913 n, each of them is referred to as "the registered comment 913".

The registered comment 913 of the present invention is not only a comment composed of letters and symbols, but also may be information recognized by a visual sense or an auditory sense. For example, pictorial symbol information, image information (including a moving image), sound information and the combination thereof could work as the registered comment 913. Further, the registered comment 913 set in the registered comment group 912 may be an incomplete comment 913 which will be completed when real-time information, such as the hand tiles of the player 5 and the elapsed time, is inserted to the incomplete comment 913. The incomplete comment 913 includes an insertion portion where the real-time information should be inserted.

Figure 6B:
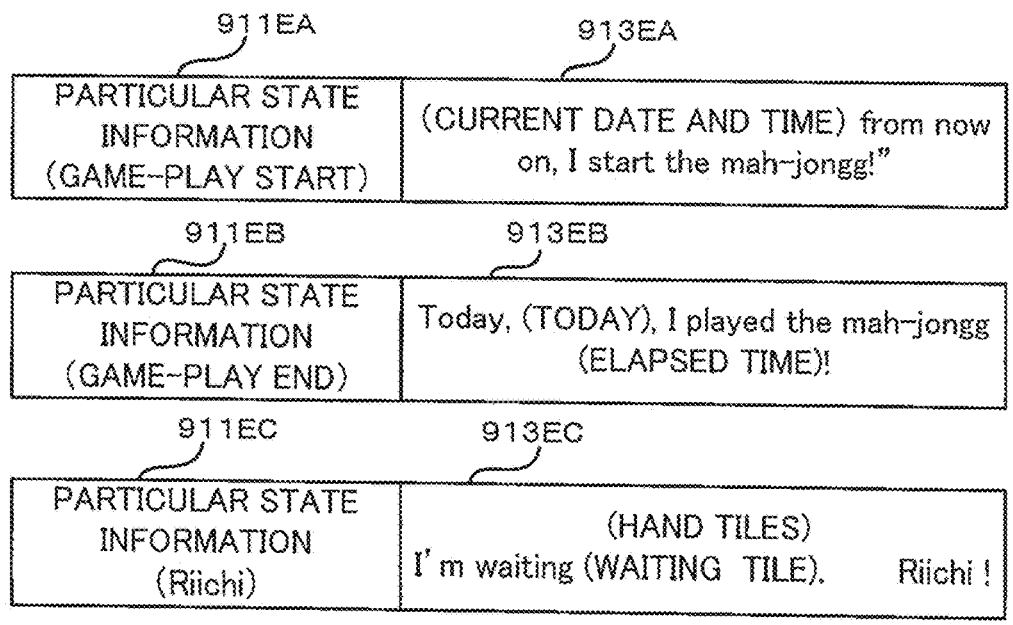
FIG. 6B is a diagram showing examples of incomplete comments.

FIG. 6B shows a concrete example of the incomplete comment 913. The incomplete comment 913EA "(CURRENT DATE AND TIME) from now on, I start the mah-jongg!" is set to the particular state "the moment when the game-play starts", and designed so that the current date and time as the real-time information should be inserted into the insertion portion (CURRENT DATE and TIME). The incomplete comment 913EB "Today, (TODAY), I played the mah-jongg (ELAPSED TIME)!" is set to the particular state "the moment when the game-play ends", and designed so that the date of today and the elapsed time as the real-time information are inserted into the insertion portions (TODAY) and (ELAPSED TIME) respectively. The incomplete comment 913EC "(HAND TILES) I'm waiting (WAITING TILE). Riichi!" is set to the particular state "Riichi" and designed so that the hand tiles of the player 5 and the waiting tile are inserted into the insertion portions (HAND TILES) and (WAITING TILE) respectively.

Each of the insertion portion (CURRENT DATE AND TIME), the insertion portion (ELAPSED TIME), and the insertion portion (TODAY) where time information should be inserted functions as a time insertion portion, and each of the incomplete comment 913EA and the incomplete comment 913EB functions as a time incomplete comment. Each of the insertion portion (HAND TILES) and the insertion portion (WAITING TILE) where information based on a predetermined state in the game should be inserted functions as a state insertion portion, and the incomplete comment 913EC functions as a state incomplete comment.

In the registered state image 914, image information for a state image indicating visually the corresponding particular state. It is not necessary that the registered state image 914 is always set in the registered comment information 910.

Returning to FIG. 4, the game device control unit 70 will be described. The game device control unit 70 is configured as a computer having a CPU and an internal memory area necessary for operations by the CPU. The game device control unit 70 comprises a game processing portion 71, a delivery information processing portion 72, and a time measuring portion 73. The time measuring portion 73 measures the current time and the elapsed time since the moment when the game-play starts. The game processing portion 71 controls the progress of the mah-jongg game according to operations by the player 5 of the game device 3 and operations by the players 5 of the other game devices 3, and manages the current game state. And, the game processing portion 71 makes the game-state displaying portion 71a to control its display so that the game state is displayed on the game-state screen 110 according to the current game state.

Already known control methods for the mah-jongg game can be employed to the control of the game by the game processing portion 71 and the control of the game-state screen 110 by the game-state displaying portion 71a. The delivery information processing portion 72 executes processes relating to the delivery information. The delivery information processing portion 72 comprises a delivery information generating portion 74 which executes processes relating to generation of the delivery information, and a delivery information transmitting portion 75 which executes processes relating to transmission of the delivery information.

The delivery information processing portion 72 is configured so that the delivery information is generated and transmitted easily during an ongoing mah-jongg game. For example, when the ongoing game becomes the particular state, as shown in FIG. 7, a list of registered comments 913 included in the registered comment group 912 is displayed on the transmission comment screen 140. The registered comment 913 selected by a selection operation performed by the player 5 is set as the transmission comment. For the selection operation, it is only required to perform the touch operation on the registered comment 913 which should be selected. In this way, it is possible to select easily and conveniently a desired registered comment 913 with one hand for generating the transmission comment. When the transmission operation is performed to the transmission instruction portion 150 in a state that the transmission comment has been set, the transmission comment set is transmitted to the center server 2 as the delivery information. As mentioned above, also for the transmission operation, it is only required to perform only the touch operation. Hereinafter, the embodiment that this delivery information is generated is called "the first embodiment".

Further, in the game device 3, when one part of the game-state screen 110 is specified by a finger of the player 5 on the game-state screen 110, the image corresponding to the specified range of the screen 110 is set as the transmission image as it is. Hereinafter, the operation for specifying one part of the game-state screen 110 with a finger is referred to as "the image capture operation", and the image of the specified range is referred to as "the capture image". FIG. 8 shows a state that the hand tiles 111 are captured by the image capture operation performed by the player 5, the capture image 200 is displayed as the transmission image on the transmission image screen 130. In the present embodiment, by tracing the periphery of a range to be captured with a finger, the range of capture image can be specified. In this way, even in a state that inputting each tile, like each tile of the hand tiles 111, is troublesome, it is possible for the player 5 to generate the transmission image easily and conveniently by specifying a desired image with one hand. When the transmission operation is performed to the transmission instruction portion 150 in a state that the transmission image has been displayed, the capture image 200 is transmitted to the center server 2 as the delivery information. The transmission operation is similar to the operation of the first embodiment. Hereinafter, an embodiment where this delivery information is generated is called "the second embodiment."

Operations by the game device control unit 70 of the first embodiment will be described, as focusing on operations by the delivery information processing portion 72. As shown in FIG. 9, in the delivery information processing portion 72, the delivery information generating portion 74 has: a game-state determining portion 74a; a comment displaying portion 74b; a transmission image displaying portion 74c; and a transmission comment setting portion 74d, and the delivery information transmitting portion 75 has a transmission image information setting portion 75a. In the present embodiment, each of the portions 74a to 74d and 75a is a construction which is logically generated in the game device control unit 70 when the game device control unit 70 executes the game device execution program.

The game-state determining portion 74a determines whether the game state which is managed by the game processing portion 71 has become any one of the particular states set in the particular state information 911 of the registered comment information 910. When the game-state determining portion 74a determines the game state has become a particular state A (for example, "a state of winning due to the three color runs"), the comment displaying portion 74b refers to the registered comment storage portion 91, and displays on the transmission comment screen 140, a list of registered comments 913 included in the registered comment group 912 correlated to the particular state A.

Further, in a case that the incomplete comment 913 is included in the registered comment group 912 to be displayed, the comment displaying portion 74b completes and displays the incomplete comments 913 after inserting the real-time information corresponding to the insertion portion of the incomplete comment 913. The processing to be executed by the comment displaying portion 74b when the mentioned incomplete comments 913 EA to EC are displayed will be described concretely. In a case of the incomplete comment 913 EA "(CURRENT DATE AND TIME) from now on, I start the mah-jongg!", the comment displaying portion 74b obtains from the time measuring portion 73, the current date and current time, inserts the date and time into the insertion portion (CURRENT DATE AND TIME) of the incomplete comment EA, and displays the completed registered comment "January 25, pm 3:45, from now on, I start the mah-jongg!"

In a case of the incomplete comment 913EB "Today, (TODAY), I played the mah-jongg (ELAPSED TIME)!", the comment displaying portion 74b obtains today's date and the elapsed time from the time measuring portion 73, inserts the date and elapsed time obtained into the insertion portions (TODAY) and (ELAPSED TIME) in the incomplete comment 913EB respectively, and displays the completed registered comment 913 "Today, January 25, I played the mah-jongg for 3 hours and 30 minutes!".

In a case of the incomplete comment 913EC "(HAND TILES) I'm waiting (WAITING TILE). Riichi!", the comment displaying portion 74b obtains the hand-tiles information of the player 5 from the game processing portion 71, and determines the waiting tile(s) based on the hand-tiles information obtained. The comment displaying portion 74b inserts the hand-tiles information obtained and the waiting tile(s) determined into the insertion portions (HAND TILES) and (WAITING TILE) of the incomplete comments 913EC respectively. For example, when the hand-tiles information is "3,4,5,Three,Four,Five,I,I,II,VV,White,White,East,East", the comment displaying portion 74b determines that the waiting tiles are one "White" and one "East", and inserts each information into each insertion portion, and displays the registered comment 913 "3,4,5,Three,Four,Five,I,I,II,VV,White,White,East,East I'm waiting one White and one East Riichi!". For obtaining the state information to be inserted, like the waiting tile, based on the state information obtained from the game processing portion 71, the correlation between the state information from the game processing portion 71 and the state information to be inserted may be set in a table in advance, or a logical routine may be provided so as to obtain the state information to be inserted in consideration of the state information from the game processing portion 71 and also other conditions.

The transmission image displaying portion 74c has an image memory 74cm for holding image information which is displayed on the transmission image screen 130. When the registered state image 914 is prepared for the particular state A, the transmission image displaying portion 74c takes in the image information of the registered state image to the image memory 74cm to display the registered state image as a transmission image on the transmission image screen 130. When one registered comment 913 is selected from a list of the registered comments 913 of the registered comment group 912 which has been displayed on the transmission comment screen 140 by the selection operation performed by the player 5, the transmission comment setting portion 74d sets the registered comment 913 selected as a transmission comment. For example, the color of the registered comment 913 selected may be changed, for indicating that the transmission comment has been set.

The delivery information transmitting portion 75 makes the transmission image information setting portion 75a activate in response to the transmission operation by the player 5. In a case that a partial image which should be replaced with the image identification information 331 is included in the transmission image displayed on the transmission image screen 130, that is, in a case that the image information 332 of the replacement information 330 is included in the image information of the transmission image, the transmission image information setting portion 75a replaces the image information 332 with the corresponding image identification information 331. In the present embodiment, in a case that a front image of any one of the tiles is included in the transmission image as the partial image, the image information 332 corresponding to the partial image is replaced with the corresponding image identification information 331, and the transmission image including the image identification information 331 is set as the transmission image information. The image identification information 331 is textual information having a predetermined number of letters. Thereby, it is possible to decrease the amount of data of the image information to be transmitted to the center server 2. When the transmission image information is set, the delivery information transmitting portion 75 transmits the delivery information including the transmission comment and the transmission image information to the center server 2.

Figure 10:
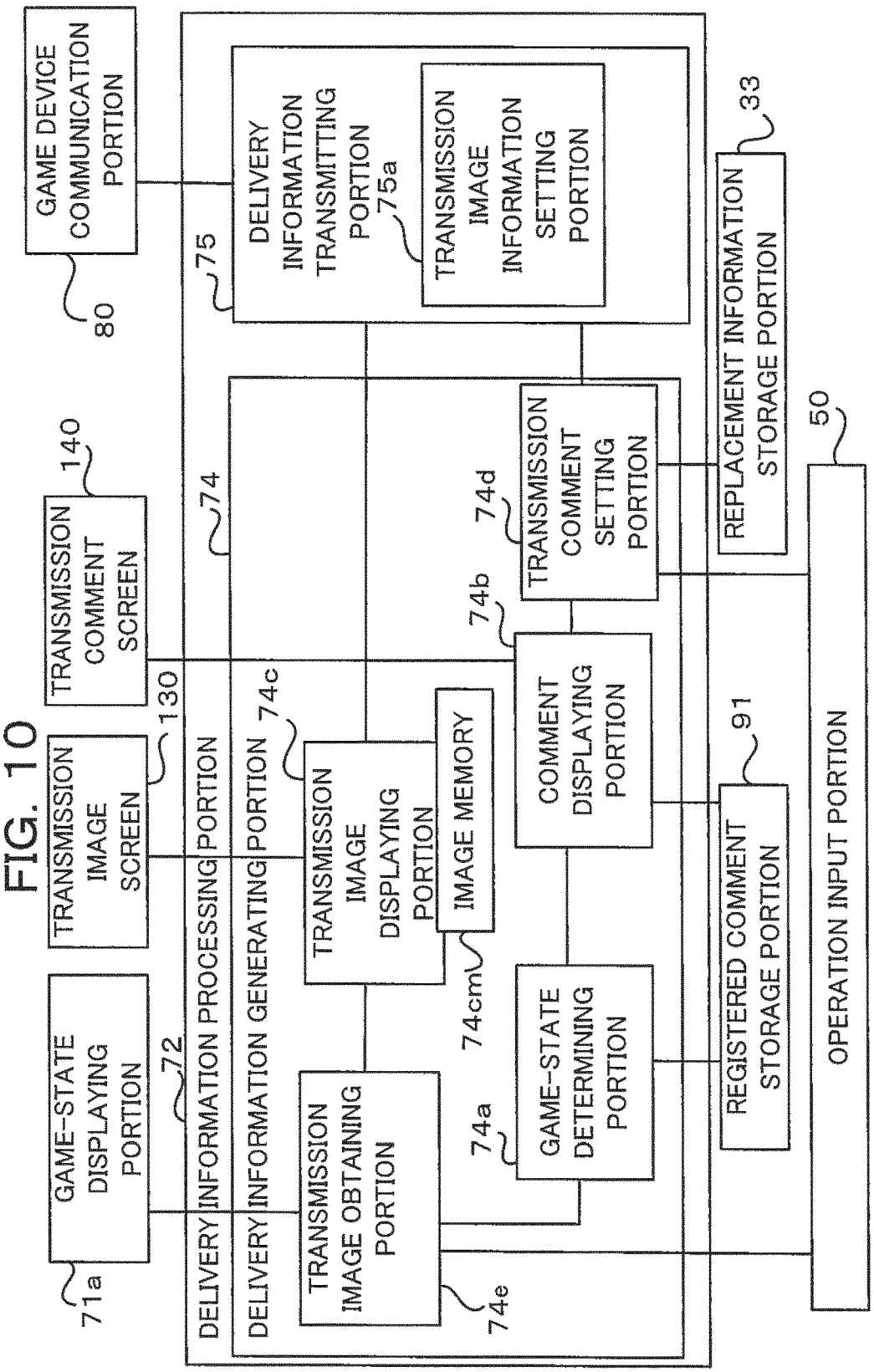
FIG. 10 is a functional bloc diagram showing operations of the game device control unit in the second embodiment.

Operations by the game device control unit 70 of the second embodiment will be described, as focusing on operations by the delivery information processing portion 72. As shown in FIG. 10, in the delivery information processing portion 72, the delivery information generating portion 74 has: a game state determining portion 74a; a comment displaying portion 74b; a transmission image displaying portion 74c; a transmission comment setting portion 74d; and a transmission image obtaining portion 74e, and the delivery information transmitting portion 75 of the delivery information processing portion 72 has a transmission image information setting portion 75a. In the present embodiment, each of the portions 74a to 74e and 75a is a construction which is logically generated in the game device control unit 70 when the game device control unit 70 executes a game device execution program.

When one part of the game-state screen 110 is specified with the player 5's finger as the image capture operation, the transmission image obtaining portion 74e obtains image information corresponding to the image of the specified range, that is, the capture image 200 from the game-state displaying portion 71a. The transmission image displaying portion 74c takes in the image information obtained to the image memory 74cm, and displays the capture image 200 on the transmission image screen 130 based on the image information obtained. The game-state determining portion 74a determines whether the capture image 200 shows the particular state or not, that is, whether the image information of the capture image 200 is the image information corresponding to one of the particular states stored in the registered comment storage portion 91. For example, the capture image 200 is compared to the registered state image 914, and when the images are identical (or, almost identical) to each other, it is determined that the capture image 200 shows the particular state corresponding to the registered state image 914 identical to the capture image 200.

In a case that it is determined that the capture image 200 shows a particular state C, the comment displaying portion 74b displays a list of registered comments 913 included in the registered comment group 912 correlated to the particular state C on the transmission comment screen 140. As with the first embodiment, when one registered comment 913 is selected by the selection operation performed by the player 5 from the list of the registered comments 913 displayed on the transmission comment screen 140, the transmission comment setting portion 74d sets the registered comment 913 selected as a transmission comment.

On the other hand, in a case that it is determined that the game-state determining portion 74a does not show any particular state, no registered comments 913 of registered comment group 912 are displayed on the transmission comment screen 140. In this case, in response to the input operation by the player 5, the comment displaying portion 74b displays the comment inputted by the input operation on the transmission comment screen 140. For inputting the comment, for example, when the touch-operation is performed on the transmission comment screen 140, so-called a screen keyboard may be displayed on the game screen 100, and the comment may be inputted by the touch operation to the screen keyboard. Or, the comment may be inputted by a physical keyboard. The transmission comment setting portion 74d sets the comment inputted as the transmission comment. Since the operations of the delivery information transmitting portion 75 are similar to the operations in the first embodiment, the explanation of the operations will be omitted.

Figure 11:
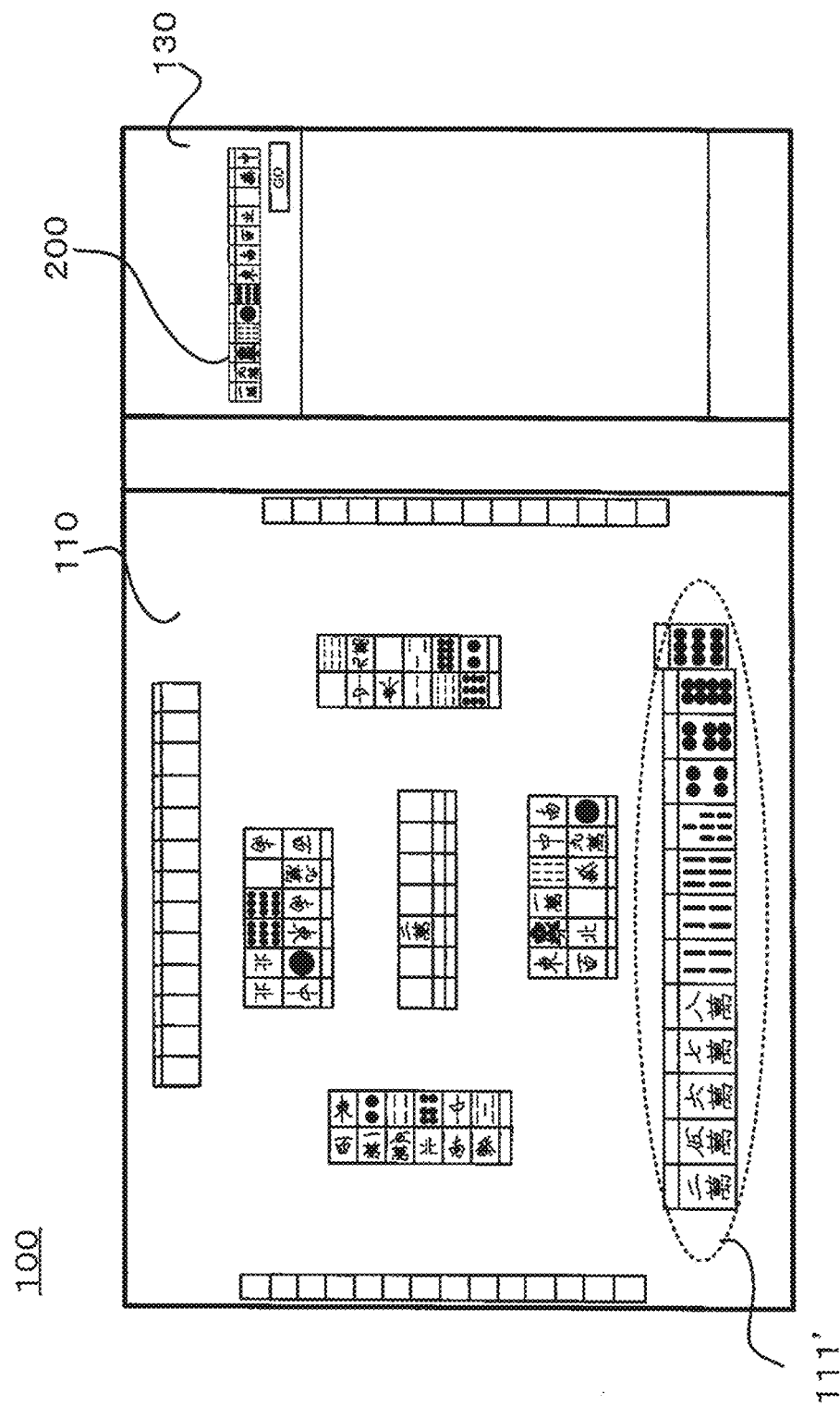
FIG. 11 is a diagram showing a state that the capture image does not change in conjunction with the game state screen.

The image information of the capture image 200 maintains until the next image capture operation is performed. Accordingly, after the capture image 200 is displayed on the transmission image screen 130, as shown in FIG. 11, even if the state of hand tiles 111' changes, the capture image 200 displayed on the transmission image screen 130 does not change.

Figure 12:
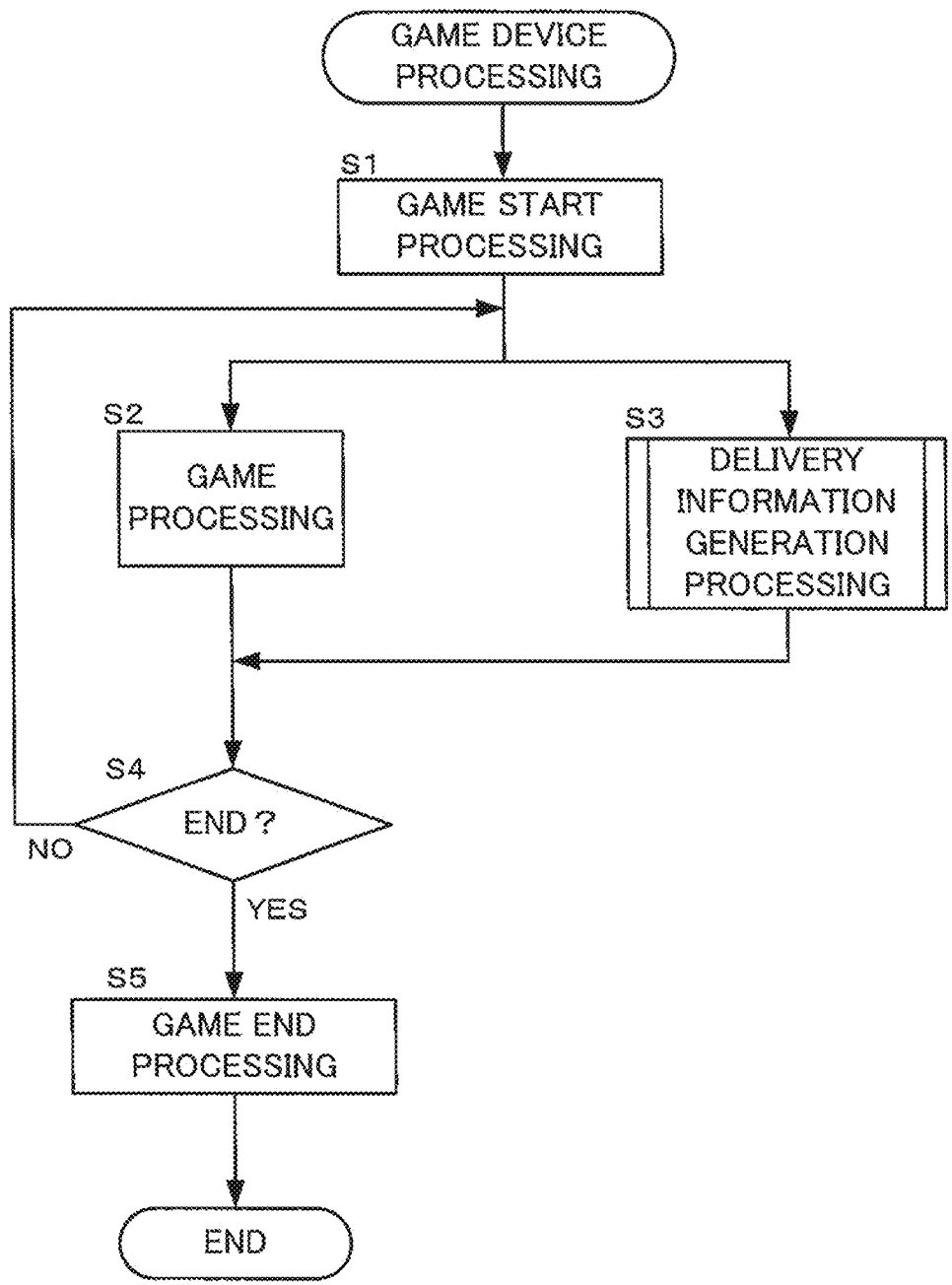
FIG. 12 is a flow chart showing the process flow of the game device processing.
Figure 13:
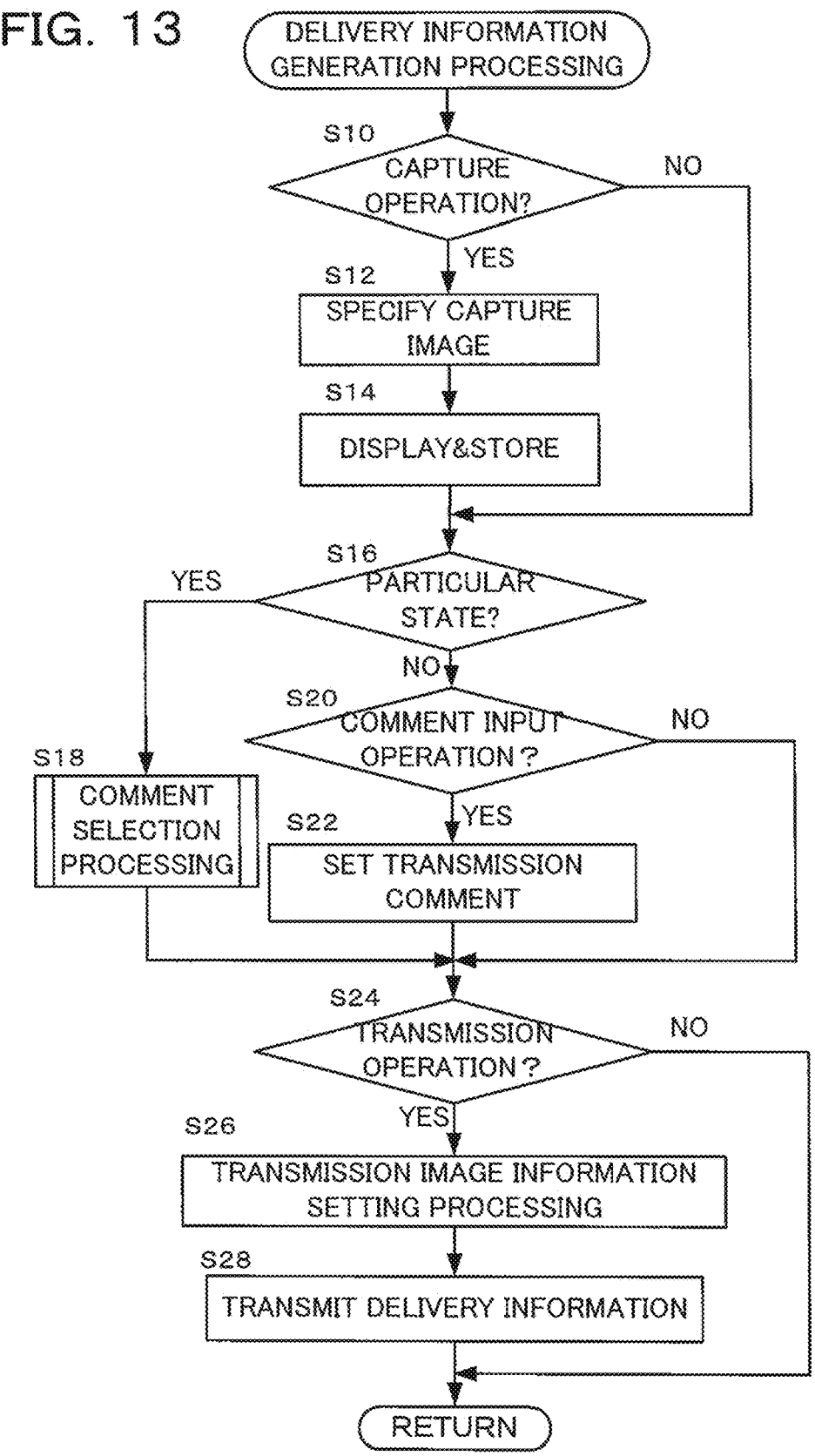
FIG. 13 is a flow chart showing the process flow of the delivery information generation processing in the game device processing shown in FIG. 12.
Figure 14:
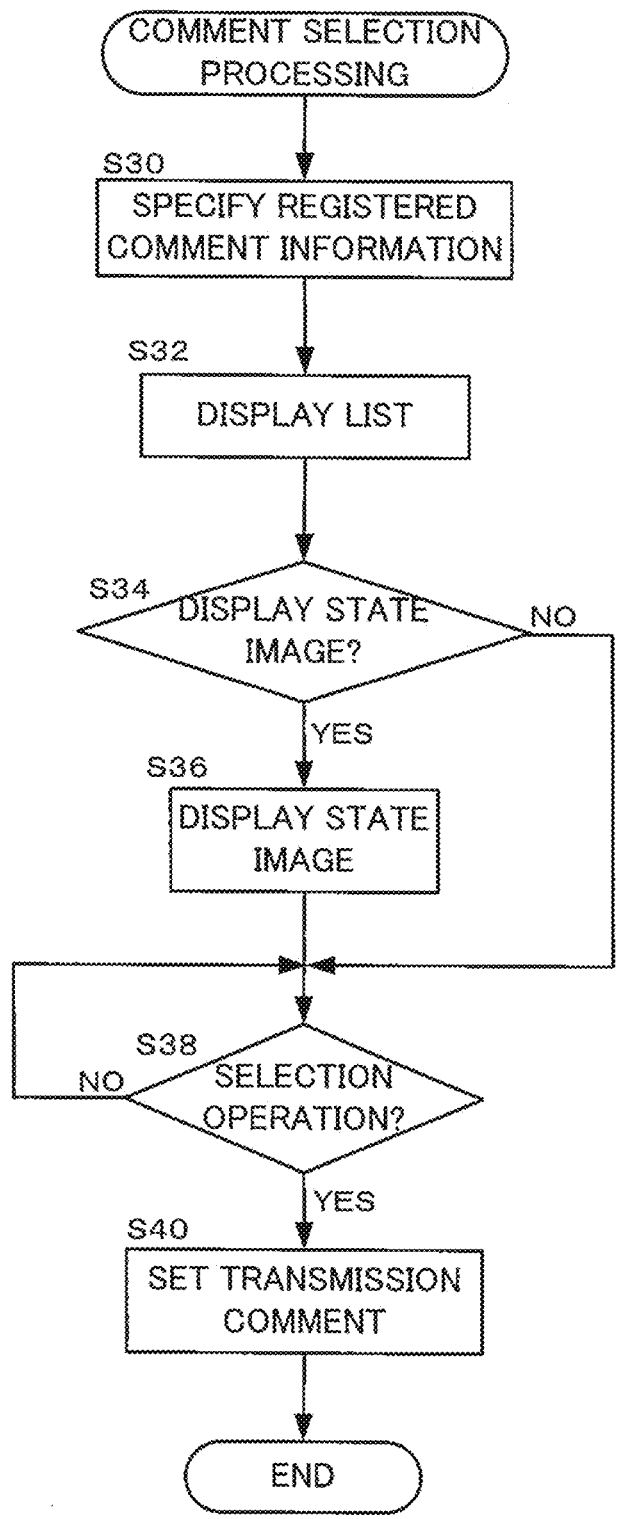
FIG. 14 is a flow chart showing the process flow of the comment selection processing in the delivery information generation processing shown in FIG. 13.

Processing to be executed by the game device control unit 70 of the game device 3 (hereinafter, sometimes referred to as "the control unit 70") will be described by following flow charts shown in FIGS. 12 to 14. The processing of the game device control unit 70 shown in FIGS. 12 to 14 is shared between the first embodiment and the second embodiment. First, when a predetermined start operation (for example, putting in a predetermined game value) has been performed by the player 5, the control unit 70 executes a game start processing. In the game start processing, executed is conventional processing for starting a mah-jongg game as a network game. For example, the control unit 70 executes the processing for log in to the center server 2, and the processing for determining the competitors.

After the game has started, the control unit 70 executes, while making the time measuring portion 73 start measuring time, game processing and delivery information generation processing for progressing the mah-jongg game (step S2 and step S3). The game processing can be conventional processing for progressing a mah-jongg game, and executed by the control unit 70 as the game processing portion 71. When the game processing is started, thereby, the game-play of the mah-jongg game starts. The delivery information generation processing is the processing relating to the generation and transmission of delivery information, and executed by the control unit 70 as the delivery information processing portion 72. The delivery information generation processing is executed repeatedly after the game-play has started until the game-play ends. The details of the delivery information generation processing will be described later.

After the game-play has started, the control unit 70 determines whether or not a predetermined game-end condition has been established (step S4). In a case that the game-end condition has been established, the control unit 70 executes game end processing. In the game end processing, for example, log-out processing is executed to the center server 2. The conventional processing can be applied as this log-out processing.

The delivery information generation processing will be described by following the flow chart shown in FIG. 13. First, the control unit 70 as the transmission image obtaining portion 74e determines whether the image capture operation has been performed to the game-state screen 110 or not (step S10). In a case that the image capture operation has not been performed, the control unit 70 goes to step S16. In a case that the image capture operation has been performed, the control unit 70 specifies the capture image 200 (step S12). That is, the control unit 70 obtains the image information corresponding to the capture image 200 from the game-state displaying portion 71a. The control unit 70 as the transmission image displaying portion 74c holds in the image memory 74cm the image information obtained, and displays the capture image 200 on the transmission image screen 130 (step S14). Next, the control unit 70 as the game-state determining portion 74a determines whether the capture image 200 or the current state is the particular state or not. When the capture image 200 is displayed on the transmission image screen 130, it is determined whether the capture image 200 shows the particular state or not. Alternatively, when the capture image 200 is not displayed on the transmission image screen 130, it is determined whether the current game state managed by the game processing portion 71 is the particular state or not.

In a case that the determination is affirmative in step S16, the control unit 70 goes to comment selection processing (step S18). The comment selection processing will be described later. In a case that the determination is negative in step S16, the control unit 70 as the comment displaying portion 74b determines whether the operation for inputting a comment has been performed or not (step S20). In a case that the determination is negative in step S20, the control unit 70 goes to step S24. In a case that the determination is affirmative in step S20, the comment inputted is displayed on the transmission comment screen 140. The control unit 70 as the transmission comment setting portion 74d sets the input comment displayed on the transmission comment screen 140 as the transmission comment (step S22). After that, the control unit 70 goes to step S24, and the control unit 70 as the delivery information transmitting portion 75 determines whether the transmission operation has been performed or not.

In step S24, when the determination is negative, the control unit 70 returns to step S10. When the determination is affirmative in step S24, the control unit 70 goes to transmission image information setting processing (step S26). In the transmission image information setting processing, as mentioned above, by the control unit 70 as the transmission image information setting portion 75a, the transmission image information is set by replacing one part of the transmission image information with the corresponding image identification information 331. When the part image which should be converted into the image identification information 331 does not exist, the control unit 70 sets the image information of the transmission image displayed on the transmission image screen 130 as the transmission image information as it is. Subsequently, the control unit 70 transmits the transmission comment and the transmission image information as the delivery information to the center server 2 (step S28). The player ID 311 of the player 5 is correlated to the delivery information to be transmitted to the center server 2. It could happen that the delivery information does not include any one of the transmission comment and the transmission image information. After transmitting the delivery information, the control unit 70 returns to step S10 in the delivery information generation processing.

The comment selection processing will be described by following a flow chart shown in FIG. 12. First, the control unit 70 as the comment displaying portion 74b specifies in the registered comment storage portion 91, the registered comment information 910 corresponding to the particular state recognized in step S16 (step S30). Subsequently, the control unit 70 displays on the transmission comment screen 140, a list of the registered comments 913 of the registered comment group 912 in the registered comment information 910 specified (step S32). When the incomplete comment having the insertion portion is included in the registered comment group 912, as mentioned above, the control unit 70 obtains necessary real time information from the time measuring portion 73 or the game processing portion 71, and inserts the real time information into the insertion portion. Then, the control unit 70 displays the registered comment 913 completed. Next, the control unit 70 as the transmission image displaying portion 74c determines whether to display the registered state image 914 corresponding to the particular state on the transmission image screen 130 (step S34). For example, in a case that the capture image 200 has been already displayed on the transmission image screen 130, or in a case that the registered state image 914 does not exist, the determination becomes negative, and the control unit 70 goes to step S38 in the comment selection processing.

In a case that the determination is affirmative in step S34, the control unit 70 as the transmission image displaying portion 74c takes in the image information of the registered state image 914 to the image memory 74cm, and displays the registered state image 914 on the transmission image screen 130 (step S36). Subsequently, the control unit 70 becomes a waiting state for selection of a registered comment 913 (step S38). When the selection operation for selecting one registered comment 913 from the registered comment group 912 is performed, the control unit 70 as the transmission comment setting portion 74d sets the registered comment 913 selected to the transmission comment (step S40). After setting the transmission comment, the control unit 70 ends the comment selection processing.

Figure 15:
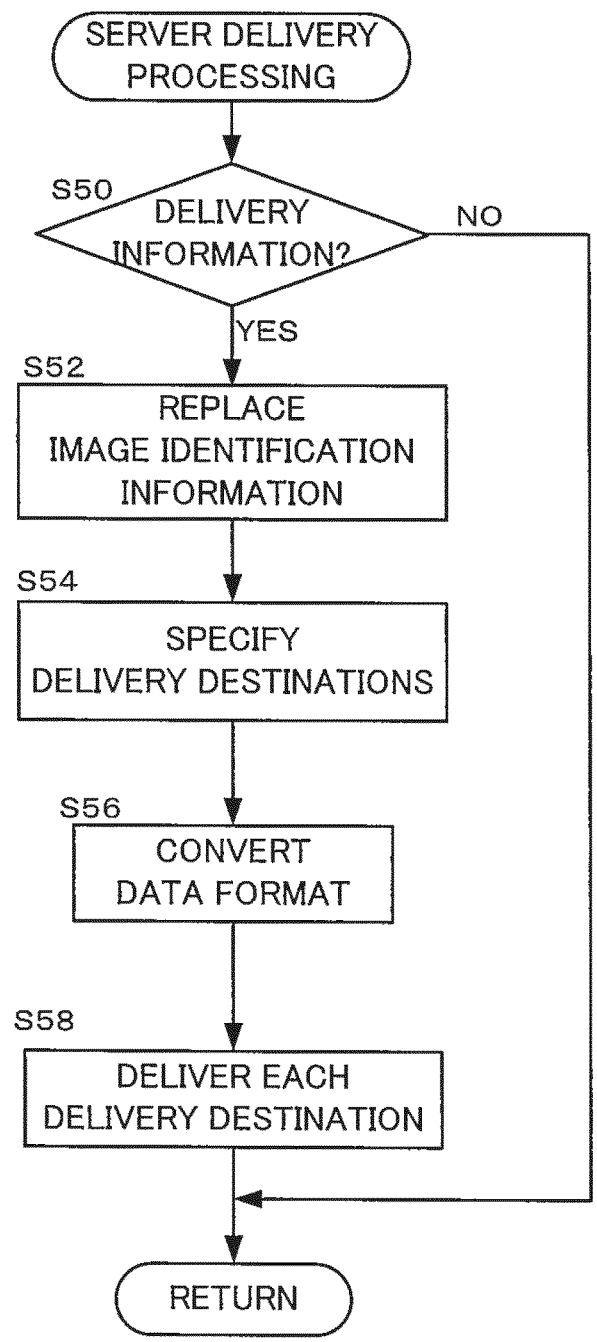
FIG. 15 is a flow chart showing the process flow of the server delivery process.

After receiving the delivery information, the center server 2 executes server delivery processing. The server delivery processing will be described by following a flow chart shown in FIG. 15. The server delivery processing is controlled by the server control unit 20 (hereinafter, referred to as "the control unit 20") as the delivery processing portion 21. First, the control unit 20 monitors reception of delivery information (step S50). When delivery information is received, the control unit 20 as the replacement processing portion 21a determines whether the image identification information 331 is included in the transmission image information of the delivery information, by referring to the replacement information storage portion 33. In a case that the image identification information 331 is included, the control unit 20 replaces the image identification information 331 with the corresponding image information 332 (step S52).

Next, the control unit 20 as the delivery destination specifying portion 21b specifies the delivery destination of the delivery information received (step S54). Specifically, the control unit 20 refers to the player information storage portion 31 to specify the player information 310 of the player 5 who transmitted the delivery information, by using the player ID 311 correlated to the delivery information. Then, the control unit 20 specifies the delivery destination addresses 312a that is, the delivery destinations, correlated to the player 5, by using the delivery destination information 312 of the player information 310.

Subsequently, the control unit 20 as the data format processing portion 21c converts the data format of the delivery information appropriately for each of the delivery destinations specified (step S56). Specifically, the control unit 70 refers to the data format storage portion 32 by using the exterior system ID 312b correlated to each specified delivery destination address 312a as a detection key, and specifies the data format 321 correlated to the exterior system ID 312b. In a case that the data format 321 specified is different from the data format of the delivery information to be delivered, the control unit 20 converts the format of the delivery information to the format set in the data format 321.

The conversion of format is executed as mentioned above. For example, in a case that an image management server manages image information, the image information included in the delivery information is set so as to be transmitted to the image management server. Further, in a case that the transmission comment is sound information, for the exterior system 6 which does not deal with sound information, the sound information is converted to notes information corresponding to the sound information, and the notes information is set as the transmission comment. For example, notes information (a music score) corresponding to sound information which is set as the registered comment 913 may be prepared in advance in the center server 2. Then, the control unit 20 as the delivery portion 21d delivers the delivery information the format of which has been converted to the data format 321 of each delivery destination so as to reach the corresponding delivery destination address 312a (step S58).

By the server delivery processing, the delivery information to be delivered is delivered to the address or domain of the exterior system 6 corresponding to the delivery destination address 312a. Due to this, the exterior user can see the delivery information via the personal computer 8A or the portable phone 8B. Thereby, the player 5 can transmit his/her realistic comment based on the game state of ongoing mah-jongg game with a simple and convenient operation, and the exterior user can receive the realistic comment from the player 5 playing the mah-jongg game. The orders of processes shown in FIGS. 12 to 15 can be changed as long as the present invention is realized.

The present invention is not limited to the above embodiments, and can be also executed in various embodiments. For example, in a case that a competitor is set as the delivery destination in the delivery destination information 312, this case will bring an inconvenient situation that the hand-tiles information is transmitted to the competitor. Accordingly, in order to prevent such inconvenient situation, the game system 1 may be configured so that the delivery information is not transmitted to the competitor. For example, when a delivery destination address 312*a* of an exterior user who is also a user of the game system 1 is registered in the delivery destination information 312, not only the exterior system ID 312*b*, but also the player ID 311 of the game system 1 of the exterior user should be registered in association with the delivery destination address 312*a*. Then, the control unit 20 should execute the processing in step S54 so that the delivery destination address 312*a* to which the player ID 311 of the competitor is correlated is excluded from the delivery destinations.

As the registered state image 914, an image which changes temporally on the game-state screen 110 such as the hand tiles of the player can be set. In this case, a part of image to be displayed on the game-state screen 110 is set to the registered state image 914. In step S36, the transmission image displaying portion 74*c* takes in the image information of "the part of image" set to the registered state image 914, from the image information of the game-state screen 110 to the image memory 74*cm*, and displays the image information taken in as the state image. Further, the game system 1 may be configured as follows: the control unit 70 is configured to maintain log information of transmission comments delivered in the ongoing mah-jongg game, and when a predetermined operation is performed by a player, the log information is listed on the transmission comment screen 140. A button or an operation key corresponding to each operation, such as the transmission operation, the selection operation or the like, may be prepared and an operation to the button or the operation key may be recognized as each operation by a player.

For the communication between the center server 2 and the game device 3, not an open network like the internet 4, a local network system or a peer-to-peer system can be employed. In this case, the communication function of the center server 2 can be configured so that the center server 2 accesses the game device 3 via the local network, and also accesses the service providing server 7 via the internet. Further, for the communication between the center server 2 and the service providing server 7, not the open network like the internet 4, a local network can be employed.

The game of the present invention is not limited to a battle game, and also can be a game such that plural players 5 cooperate with each other to accomplish a predetermined aim. Further, it is not necessary that the game of the present invention is executed by plural game devices 3. A game which is executed by a single player of one game device 3 is also applied to the game of the present invention. The game device 3 is not limited to a game device for commercial use, and also can be a game device for home use or a personal computer as long as the present invention is realized.

What is claimed is:

1. A game system including a server and at least one game device which are communicable with each other, the game device having: an operation input portion for accepting operations by a player; and a display portion where a game screen is displayed, wherein the game device comprises:

a registered comment storage portion which stores registered comment information where each of a plurality of particular states in a game and a plurality of registered comments are correlated to each other, wherein each of the particular states is set in the registered comment information as a potential state of the game, and each of the registered comments is prepared and set in advance and stored as part of the registered comment information so as to be correlated to a corresponding particular state; and a computer functioning as:

a game processing portion which is configured to manage information of a current game state and display the current game state in a game-state displaying area on the game screen, while controlling to progress the game; and a delivery information processing portion which is configured to generate delivery information to be delivered via the server, the computer functioning as the delivery information processing portion being further programmed to function as:

a game-state determining portion which is configured to refer to the registered comment storage portion and determine whether or not the information of the current game state managed by the game processing portion indicates any one of the plurality of particular states which have been correlated to the registered comments in the registered comment information;

a comment displaying portion which is configured to, in a case that the information of the current game state indicates the particular state, refer to the registered comment storage portion and display in a transmission comment displaying area on the game screen the registered comments stored in the registered comment storage portion correlatedly to the particular state which the game-state determination portion has determined that the current game state indicates;

a transmission comment setting portion which is configured to, in response to an selection operation by the player for selecting a registered comment from the registered comments displayed, set the registered comment selected as a transmission comment; and a delivery information transmitting portion which is configured to, in response to a predetermined transmission operation by the player, transmit the delivery information including the transmission comment to the server, together with player identification information of the player, and the server comprises:

a player information storage portion which stores player information where delivery destination specifying information for specifying at least one delivery destination to which the delivery information of the player is delivered via a predetermined network is stored in association with player identification information of each player; and a computer functioning as:

a delivery destination specifying portion which is configured to refer to the player information, when receiving the delivery information, to specify the delivery destination corresponding to the player identification information indicated by the delivery information; and a delivery portion which is configured to deliver the delivery information to each delivery destination specified via the network.

2. The game system according to claim 1, wherein the registered comment is a state incomplete comment including a state insertion portion where information based on a predetermined state which is managed by the game processing portion is to be inserted, and the comment displaying portion is configured to, when displaying the state incomplete comment, obtain information indicating the predetermined state from the game processing portion, and the insert information based on the predetermined state into the state insertion portion to complete and display the state incomplete comment completed.

3. The game system according to claim 2, wherein
the game processing portion is configured to display in the game-state displaying area, a set of combination of plural kinds of items which is held by the player, and control to progress the game while changing the combination by following the operations by the player,
the state insertion portion of the state incomplete comment is set so that information indicating a state of the plural kinds of items held by the player as the information based on the predetermined state is inserted into the state insertion portion, and
the comment displaying portion is configured to obtain from the game processing portion and insert into the state insertion portion, the information indicating the state of plural kinds of items held by the player to complete the state incomplete comment.

4. The game system according to claim 3, wherein
the game is a mah-jongg game, and the plural kinds of items held by the player are hand tiles of the player.

5. The game system according to claim 1, wherein
the game device comprises the computer further functioning as a time measuring portion which is configured to manage time information,
the registered comment is a time incomplete comment including a time insertion portion where the time information managed by the time measuring portion is to be inserted, and
the comment displaying portion is configured to obtain, when displaying the time incomplete comment, the time information from the time measuring portion, and insert the time information obtained into the time insertion portion to complete and display the time incomplete comment completed.

6. The game system according to claim 1, wherein
each delivery destination specifying information included in the player information is stored in association with a data format which the delivery destination requires to receive the delivery information,
the server comprises the computer further functioning as a data format processing portion which is configured to, when the delivery destination is specified, convert a data format of the delivery information to the data format the delivery destination specified requires, and
the delivery portion is configured to deliver to the delivery destination specified, the delivery information in the data format converted.

7. The game system according to claim 1, wherein
on the game screen, a transmission instruction area where to instruct transmission is further provided,
the operation input portion includes a touch panel provided at least on the transmission comment displaying area and the transmission instruction area on the game screen,
the transmission comment setting portion is configured to, when, as the selection operation, an operation for specifying a position corresponding to any one of the registered comments displayed in the transmission comment displaying area is performed to the touch panel, set the registered comment corresponding to the position specified as the registered comment selected, and
the delivery information transmitting portion is configured to transmit the delivery information when an operation for specifying a position corresponding to the transmission instruction area, as the transmission operation, is performed to the touch panel.

8. The game system according to claim 1, wherein
in the registered comment information, to each of the particular states, image information of a state image showing the particular state is further correlated,
the game device has the computer further functioning as a transmission image displaying portion which is configured to display, in a case that the current game state is the particular state, the state image correlated to the particular state in a transmission image displaying area on the game screen, and
the delivery information transmitting portion is configured to transmit to the server, the delivery information including the image information of the state image displayed in the transmission image displaying area, as transmission image information, in addition to the transmission comment.

9. The game system according to claim 8, wherein
each of the game device and the server comprises a replacement information storage portion that stores replacement information where image information of a part of the state image and image identification information for identifying the image information are correlated to each other,
the delivery information transmitting portion of the game device is configured to further have a transmission image information setting portion which is configured to refer to the replacement information, and in a case that the image information of the part of the state image to be included in the delivery information is set in the replacement information, replace the image information of the part with the corresponding image identification information to set the transmission image information, and
the server has the computer further functioning as a replacement processing portion which is configured to refer to, when the delivery information is received, the replacement information storage portion and to replace the image identification information in the transmission image information included in the delivery information with the corresponding image information.

10. A game device being communicable with a server which delivers information to predetermined delivery destinations, and having: an operation input portion for accepting operations by a player; and a display portion where a game screen is displayed, wherein
the game device comprising:
a registered comment storage portion which stores registered comment information where each of a plurality of particular states in a game and a plurality of registered comments are correlated to each other, wherein each of the particular states is set in the registered comment information as a potential state of the game, and each of the registered comments is prepared and set in advance and stored as part of the registered comment information so as to be correlated to a corresponding particular state; and
a computer functioning as:
a game processing portion which is configured to manage information of a current game state and display the current game state in a game-state displaying area on the game screen, while controlling to progress the game; and
a delivery information processing portion which is configured to generate the delivery information to be delivered from the server, the computer functioning as the delivery information processing portion being further programmed to function as:
a game-state determining portion which is configured to refer to the registered comment storage portion and determine whether or not the information of the current game state managed by the game processing portion indicates any one of the plurality of particular states which have been correlated to the registered comments in the registered comment information;
a comment displaying portion which is configured to, in a case that the information of the current game state indicates the particular state, refer to the registered comment storage portion and display in a transmission comment displaying area on the game screen the registered comments stored in the registered comment storage portion correlatedly to the particular state which the game-state determination portion has determined that the current game state indicates;
a transmission comment setting portion which is configured to, in response to an selection operation by the player for selecting a registered comment from the registered comments displayed, set the registered comment selected as a transmission comment;
and
a delivery information transmitting portion which is configured to, in response to a predetermined transmission operation by the player, transmit the delivery information including the transmission comment to the server, together with player identification information of the player.

* * * * *